United States Patent
Wu et al.

(10) Patent No.: US 12,225,279 B2
(45) Date of Patent: Feb. 11, 2025

(54) INPUT METHOD AND ELECTRONIC DEVICE

(71) Applicant: Huawei Technologies Co., Ltd., Shenzhen (CN)

(72) Inventors: Qingliang Wu, Saint Petersburg (RU); Yanming Zhu, Shanghai (CN); Yayun Zhang, Shanghai (CN); Deqi Hu, Shanghai (CN); Wei Chen, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 359 days.

(21) Appl. No.: 17/581,505

(22) Filed: Jan. 21, 2022

(65) Prior Publication Data

US 2022/0150403 A1 May 12, 2022

Related U.S. Application Data

(63) Continuation of application No. PCT/CN2020/103096, filed on Jul. 20, 2020.

(30) Foreign Application Priority Data

Jul. 25, 2019 (CN) .......................... 201910677040.2

(51) Int. Cl.
H04N 23/611 (2023.01)
G06V 40/16 (2022.01)
H04N 23/62 (2023.01)
H04N 23/667 (2023.01)

(52) U.S. Cl.
CPC ......... *H04N 23/611* (2023.01); *G06V 40/178* (2022.01); *H04N 23/62* (2023.01); *H04N 23/667* (2023.01)

(58) Field of Classification Search
None
See application file for complete search history.

(56) References Cited

U.S. PATENT DOCUMENTS

| | | | |
|---|---|---|---|
| 9,596,405 | B2 | 3/2017 | Huang et al. |
| 2004/0208114 | A1 | 10/2004 | Lao et al. |
| 2010/0172641 | A1 | 7/2010 | Sasaki et al. |
| 2012/0268408 | A1 | 10/2012 | Chen et al. |
| 2013/0120298 | A1 | 5/2013 | Zhou |
| 2015/0271389 | A1 | 9/2015 | Huang et al. |
| 2017/0227162 | A1* | 8/2017 | Saika ................... H04N 23/11 |
| 2018/0091728 | A1* | 3/2018 | Brown ................. H04N 5/91 |
| 2018/0211355 | A1* | 7/2018 | Newman ............. H04N 23/661 |
| 2018/0307385 | A1 | 10/2018 | Qu et al. |

FOREIGN PATENT DOCUMENTS

| | | | |
|---|---|---|---|
| CN | 1522052 | A | 8/2004 |
| CN | 101827218 | A | 9/2010 |
| CN | 101963863 | A | 2/2011 |

(Continued)

*Primary Examiner* — Gelek W Topgyal
(74) *Attorney, Agent, or Firm* — Conley Rose, P.C.

(57) ABSTRACT

A photographing method includes receiving a pressing operation performed by a user on a photographing control of the camera application, and determining, based on both an age of the user and pressing duration of the pressing operation, whether to shoot one photo or continuously shoot a plurality of photos.

20 Claims, 12 Drawing Sheets

(56) References Cited

FOREIGN PATENT DOCUMENTS

| | | | |
|---|---|---|---|
| CN | 103856709 A | | 6/2014 |
| CN | 104469126 A | | 3/2015 |
| CN | 104618580 A | | 5/2015 |
| CN | 104750418 A | | 7/2015 |
| CN | 104777985 A | | 7/2015 |
| CN | 105100481 A | * | 11/2015 |
| CN | 105677077 A | * | 6/2016 |
| CN | 105827956 A | | 8/2016 |
| CN | 106096964 A | | 11/2016 |
| CN | 106909285 A | | 6/2017 |
| CN | 106973229 A | | 7/2017 |
| CN | 110471606 A | | 11/2019 |
| KR | 101628990 B1 | | 6/2016 |
| KR | 20180014575 A | * | 2/2018 |

* cited by examiner

INPUT METHOD AND ELECTRONIC DEVICE

CROSS-REFERENCE TO RELATED APPLICATIONS

This is a continuation of International Patent Application No. PCT/CN2020/103096 filed on Jul. 20, 2020, which claims priority to Chinese Patent Application No. 201910677040.2 filed on Jul. 25, 2019. The disclosures of the aforementioned applications are hereby incorporated by reference in their entireties.

TECHNICAL FIELD

This application relates to the field of electronic device technologies, and in particular, to an input method and an electronic device.

BACKGROUND

With popularization of touchscreens, an input mode used by people on an electronic product has changed from physical button input to touchscreen input. The touchscreen input means that an operation performed by a user on a screen is received using a touchscreen such that an electronic device makes a response corresponding to the operation. Most commonly used operations of the user usually include a short press (namely, a tap), a long press, a swipe, and the like.

However, because different users have different duration understandings and operations for the short press and the long press, it is usually caused that a long press is performed instead of a short press that some users want to perform, and consequently the electronic device makes an incorrect response. For example, when a user wants to shoot one photo through a short press, a plurality of photos are continuously shot because input of the user is recognized as a long press. For another example, when a user wants to view a single picture through a short press, picture selection is performed because input of the user is recognized as a long press. It can be learned that, because the electronic device cannot accurately recognize an operation entered by the user, the electronic device may make an incorrect response. Consequently, input efficiency of the user is low.

SUMMARY

Embodiments of this application provide an input method to enable an electronic device to accurately determine a pressing operation entered by a user and make a correct response. This improves input efficiency of the user.

According to a first aspect, an embodiment of this application provides a photographing method. The method is applied to an electronic device, and a camera application is installed on the electronic device. The method includes receiving a pressing operation performed by a user on a photographing control of the camera application, determining, based on both an age of the user and pressing duration of the pressing operation, a target event corresponding to the pressing operation, where the target event is shooting one photo or continuously shooting a plurality of photos, and executing the target event.

According to the input method provided in this embodiment of this application, it may be determined based on the age of the user and the pressing duration of the pressing operation whether the pressing operation entered by the user is a long press operation or a short press operation, and therefore, different reaction time is set for users of different ages. All users can enter a short press operation or a long press operation according to respective understandings of a duration definition, to enable a camera to shoot one photo or continuously shoot a plurality of photos. This improves photographing efficiency of the user.

In a possible implementation, determining, based on both the age of the user and the pressing duration of the pressing operation, the target event corresponding to the pressing operation includes, determining a threshold value based on the age of the user, and when the pressing duration is greater than or equal to the threshold value, determining that the target event corresponding to the pressing operation is continuously shooting a plurality of photos, or when the pressing duration is less than the threshold value, determining that the target event corresponding to the pressing operation is shooting one photo.

In this embodiment of this application, the threshold value applicable to the user may be determined based on the age of the user. A pressing operation whose pressing duration is greater than or equal to the threshold value is a long press operation, and in this case, a plurality of photos can be continuously shot. A pressing operation whose pressing duration is less than the threshold value is a short press operation, and in this case, one photo can be shot. The threshold value is set based on the age of the user, to avoid that the electronic device cannot accurately recognize an intention of the user because the users of different ages have different understandings of a duration definition. This improves photographing efficiency of the user.

In another possible implementation, determining the threshold value based on both the age of the user and the pressing duration of the pressing operation includes determining the threshold value based on the age of the user and a touch pressure value, where the touch pressure value is an average pressure value of pressing any control by the user in a period of time.

A touch pressure value may further reflect an age of a user to some extent. Usually, an older user indicates a less sensitive reaction speed of the user, and therefore, a pressing force when the user enters a pressing operation is correspondingly relatively large. In this embodiment of this application, the threshold value applicable to the user may be determined based on the age of the user and the touch pressure value. Further, types of pressing operations entered by different users can be accurately recognized, so that a correct response is made. This improves photographing efficiency of the user.

In another possible implementation, determining the threshold value based on both the age of the user and the pressing duration of the pressing operation includes determining the threshold value based on the age of the user and a range to which a touch pressure value belongs.

Further, pressure values of pressing any control by the user in a period of time may be classified into several ranges, and the range to which the touch pressure value belongs is a highest-frequency range to which pressure values of pressing any control by the user in the period of time belong.

This embodiment of this application provides another method for determining the touch pressure value, and the touch pressure value is obtained based on a usual use habit of the user. The threshold value that is more applicable to the user may be calculated based on the touch pressure value and the age of the user. This further improves photographing efficiency of the user.

In another possible implementation, before determining, based on an age of the user, the target event corresponding to the pressing operation, the method further includes obtaining a face image of the user, and determining the age of the user based on the face image.

Possibly, the face image may be obtained when the electronic device performs face unlock.

Alternatively, a saved face image of an owner may be obtained from an internal memory, and the face image is used for face unlock.

Further, after the face image is obtained, the face image is input into a convolutional neural network, and then an age or an age category corresponding to the face image is output. The convolutional neural network may be an age classification model, and the model may be obtained by training a plurality of face images whose age categories are known.

In this embodiment of this application, the age of the user is intuitively determined by using the face image such that the electronic device determines, based on the age of the user and the pressing duration of the pressing operation, whether the pressing operation entered by the user is a long press operation or a short press operation. This improves photographing efficiency of the user.

In another possible implementation, before determining, based on the age of the user, the target event corresponding to the pressing operation, the method further includes determining the age of the user based on a font size of the electronic device.

In this embodiment of this application, the age of the user is indirectly reflected by using the font size. When the age of the user cannot be directly obtained, the age of the user is determined by using the font size such that the photographing method provided in this embodiment of this application is applicable to more application scenarios.

According to a second aspect, an embodiment of this application provides a photographing method. The method is applied to an electronic device, and a camera application is installed on the electronic device. The method includes receiving a first pressing operation performed by a first user on a photographing control of the camera application, shooting one photo in response to the first pressing operation, receiving a second pressing operation performed by a second user on the photographing control, and continuously shooting a plurality of photos in response to the second pressing operation. An age of the first user is greater than an age of the second user, and pressing duration of the first pressing operation is the same as that of the second pressing operation.

In this embodiment of this application, the two users of different ages enter the pressing operations of the same pressing duration, and the electronic device can make different responses. It is determined based on an age of a user whether a pressing operation entered by the user is a long press operation or a short press operation, and therefore, different reaction time is set for users of different ages. All users can enter a short press operation or a long press operation according to respective understandings of a duration definition, to enable a camera to shoot one photo or continuously shoot a plurality of photos. This improves photographing efficiency of the user.

In a possible implementation, the shooting one photo in response to the first pressing operation includes determining, based on both the age of the first user and the pressing duration of the first pressing operation, that a first target event corresponding to the first pressing operation is shooting one photo, and executing the first target event. The continuously shooting a plurality of photos in response to the second pressing operation includes determining, based on both the age of the second user and the pressing duration of the second pressing operation, that a second target event corresponding to the second pressing operation is continuously shooting a plurality of photos, and executing the second target event.

According to this embodiment of this application, it may be determined based on the age of the user and pressing duration of the pressing operation whether the pressing operation entered by the user is a long press operation or a short press operation, and therefore, different reaction time is set for the users of different ages. All users can enter a short press operation or a long press operation according to respective understandings of a duration definition, to enable a camera to shoot one photo or continuously shoot a plurality of photos. This improves photographing efficiency of the user.

In another possible implementation, determining, based on both the age of the first user and the pressing duration of the first pressing operation, that the first target event corresponding to the first pressing operation is shooting one photo includes determining a first threshold value based on the age of the first user, and when it is determined that the first threshold value is greater than the first pressing duration, determining that the first target event is shooting one photo. In another possible implementation, determining, based on both the age of the second user and the pressing duration of the second pressing operation, that the second target event corresponding to the second pressing operation is continuously shooting a plurality of photos includes determining a second threshold value based on the age of the second user, and when it is determined that the second threshold value is less than or equal to the second pressing duration, determining that the second target event is continuously shooting a plurality of photos.

In this embodiment of this application, a threshold value applicable to the user may be determined based on the age of the user. A pressing operation whose pressing duration is greater than or equal to the threshold value is a long press operation, and in this case, a plurality of photos can be continuously shot. A pressing operation whose pressing duration is less than the threshold value is a short press operation, and in this case, one photo can be shot. The threshold value is set based on the age of the user, to avoid that the electronic device cannot accurately recognize an intention of the user because the users of different ages have different understandings of a duration definition. This improves photographing efficiency of the user.

In another possible implementation, determining the first threshold value based on the age of the first user includes determining the first threshold value based on the age of the first user and a first touch pressure value, where the first touch pressure value is an average pressure value of pressing any control by the first user in a period of time. In another possible implementation, determining the second threshold value based on the age of the second user includes determining the second threshold value based on the age of the second user and a second touch pressure value, where the second touch pressure value is an average pressure value of pressing any control by the second user in a period of time.

A touch pressure value may further reflect an age of a user to some extent. Usually, an older user indicates a less sensitive reaction speed of the user, and therefore, a pressing force when the user enters a pressing operation is correspondingly relatively large. In this embodiment of this application, the threshold value applicable to the user may be determined based on the age of the user and a touch pressure value. Further, types of pressing operations entered by different users can be accurately recognized, so that a correct response is made. This improves photographing efficiency of the user.

In another possible implementation, determining the first threshold value based on the age of the first user includes determining the first threshold value based on the age of the first user and a range to which a first touch pressure value belongs. The determining a second threshold value based on the age of the second user includes determining the second threshold value based on the age of the second user and a range to which a second touch pressure value belongs.

Further, pressure values of pressing any control by the first user in a period of time may be classified into several ranges, and the range to which the first touch pressure value belongs is a highest-frequency range to which pressure values of pressing any control by the first user in the period of time belong.

Further, pressure values of pressing any control by the second user in a period of time may be classified into several ranges, and the range to which the second touch pressure value belongs is a highest-frequency range to which pressure values of pressing any control by the second user in the period of time belong.

This embodiment of this application provides another method for determining the first touch pressure value and the second touch pressure value, and the first touch pressure value and the second touch pressure value are separately obtained based on usual use habits of the first user and the second user. Therefore, the first threshold value that is more applicable to the first user and the second threshold value that is more applicable to the second user are calculated. This further improves photographing efficiency of the first user and the second user.

In another possible implementation, before in response to the first pressing operation, the method further includes obtaining a face image of the first user, and determining the age of the first user based on the face image of the first user. Before in response to the second pressing operation, the method further includes obtaining a face image of the second user, and determining the age of the second user based on the face image of the second user.

Possibly, the face image may be obtained when the electronic device performs face unlock.

Alternatively, a saved face image of an owner may be obtained from an internal memory, and the face image is used for face unlock.

Further, after the face image is obtained, the face image is input into a convolutional neural network, and then an age or an age category corresponding to the face image is output. The convolutional neural network may be an age classification model, and the model may be obtained by training a plurality of face images whose age categories are known.

In this embodiment of this application, the age of the user is intuitively determined by using the face image such that the electronic device determines, based on the age of the user and the pressing duration of the pressing operation, whether the pressing operation entered by the user is a long press operation or a short press operation. This improves photographing efficiency of the user.

In another possible implementation, a font size of the electronic device when the first user uses the electronic device is a first font size, a font size of the electronic device when the second user uses the electronic device is a second font size, and the first font size is greater than the second font size. Before in response to the first pressing operation, the method further includes determining the age of the first user based on the first font size, and before in response to the second pressing operation, the method further includes determining the age of the second user based on the second font size.

In this embodiment of this application, the age of the user is indirectly reflected by using a font size. According to the photographing method, when the age of the user cannot be directly obtained, the age of the user is determined by using the font size such that the photographing method provided in this embodiment of this application is applicable to more application scenarios.

According to a third aspect, an embodiment of this application provides an input method. The method is applied to an electronic device, and the method includes detecting a pressing operation performed on a first control, determining a type of the pressing operation according to a relationship between duration of the pressing operation and a threshold value, where the type of the pressing operation includes a short press operation and a long press operation, and the threshold value is determined based on an age of a user, determining, based on the type of the pressing operation, a target event corresponding to the pressing operation, and executing the target event.

In this embodiment of this application, the threshold value applicable to the user may be determined based on the age of the user. A pressing operation whose pressing duration is greater than or equal to the threshold value is a long press operation, and a pressing operation whose pressing duration is less than the threshold value is a short press operation. The short press operation and the long press operation correspond to different target events. The threshold value is set based on the age of the user, to avoid that the electronic device cannot accurately recognize an intention of the user because users of different ages have different understandings of a duration definition. This improves input efficiency of the user.

In a possible implementation, the threshold value is determined based on the age of the user and a touch pressure value. The touch pressure value is an average pressure value of pressing any control by the user in a period of time.

A touch pressure value may further reflect an age of a user to some extent. Usually, an older user indicates a less sensitive reaction speed of the user, and therefore, a pressing force when the user enters a pressing operation is correspondingly relatively large. In this embodiment of this application, the threshold value applicable to the user may be determined based on the age of the user and the touch pressure value. Further, types of pressing operations entered by different users can be accurately recognized, so that a correct response is made. This improves input efficiency of the user.

In another possible implementation, the threshold value is determined based on the age of the user and a range to which a touch pressure value belongs.

Further, pressure values of pressing any control by the user in a period of time may be classified into several ranges, and the range to which the touch pressure value belongs is a highest-frequency range to which pressure values of pressing any control by the user in the period of time belong.

This embodiment of this application provides another method for determining the touch pressure value, and the touch pressure value is obtained based on a usual use habit of the user. The threshold value that is more applicable to the user may be calculated based on the touch pressure value and the age of the user. This further improves input efficiency of the user.

In another possible implementation, before determining the type of the pressing operation according to a relationship between duration of the pressing operation and a threshold value, the method further includes determining the age of the user.

In another possible implementation, determining the age of the user includes obtaining a face image of the user, and determining the age of the user based on the face image of the user.

Possibly, the face image may be obtained when the electronic device performs face unlock.

Alternatively, a saved face image of an owner may be obtained from an internal memory, and the face image is used for face unlock.

Further, after the face image is obtained, the face image is input into a convolutional neural network, and then an age or an age category corresponding to the face image is output. The convolutional neural network may be an age classification model, and the model may be obtained by training a plurality of face images whose age categories are known.

In this embodiment of this application, the age of the user is intuitively determined by using the face image such that the electronic device determines, based on the age of the user and the pressing duration of the pressing operation, whether the pressing operation entered by the user is a long press operation or a short press operation. This improves photographing efficiency of the user.

In another possible implementation, determining the age of the user includes determining the age of the user based on a font size of the electronic device.

In this embodiment of this application, the age of the user is indirectly reflected by using the font size. According to the photographing method, when the age of the user cannot be directly obtained, the age of the user is determined by using the font size such that the photographing method provided in this embodiment of this application is applicable to more application scenarios.

According to a fourth aspect, an embodiment of this application provides an electronic device, including one or more processors, a memory, and a wireless communications module. The memory and the wireless communications module are coupled to the one or more processors, and the memory is configured to store computer program code. The computer program code includes computer instructions. When the one or more processors execute the computer instructions, the electronic device performs the photographing method according to any one of the first aspect and the implementations of the first aspect.

According to a fifth aspect, an embodiment of this application provides an electronic device, including one or more processors, a memory, and a wireless communications module. The memory and the wireless communications module are coupled to the one or more processors, and the memory is configured to store computer program code. The computer program code includes computer instructions. When the one or more processors execute the computer instructions, the electronic device performs the photographing method according to any one of the second aspect and the implementations of the second aspect.

According to a sixth aspect, an embodiment of this application provides an electronic device, including one or more processors, a memory, and a wireless communications module. The memory and the wireless communications module are coupled to the one or more processors, and the memory is configured to store computer program code. The computer program code includes computer instructions. When the one or more processors execute the computer instructions, the electronic device performs the input method according to any one of the third aspect and the implementations of the third aspect.

According to a seventh aspect, an embodiment of this application provides a computer storage medium, including computer instructions. When the computer instructions are run on an electronic device, the electronic device is enabled to perform the photographing method according to any one of the first aspect and the implementations of the first aspect.

According to an eighth aspect, an embodiment of this application provides a computer storage medium, including computer instructions. When the computer instructions are run on an electronic device, the electronic device is enabled to perform the photographing method according to any one of the second aspect and the implementations of the second aspect.

According to a ninth aspect, an embodiment of this application provides a computer storage medium, including computer instructions. When the computer instructions are run on an electronic device, the electronic device is enabled to perform the input method according to any one of the third aspect and the implementations of the third aspect.

According to a tenth aspect, an embodiment of this application provides a computer program product. When the computer program product is run on a computer, the computer is enabled to perform the photographing method according to any one of the first aspect and the implementations of the first aspect.

According to an eleventh aspect, an embodiment of this application provides a computer program product. When the computer program product is run on a computer, the computer is enabled to perform the photographing method according to any one of the second aspect and the implementations of the second aspect.

According to a twelfth aspect, an embodiment of this application provides a computer program product. When the computer program product is run on a computer, the computer is enabled to perform the input method according to any one of the third aspect and the implementations of the third aspect.

It may be understood that the electronic device according to the fourth aspect, the computer storage medium according to the seventh aspect, or the computer program product according to the tenth aspect is configured to perform the photographing method according to the first aspect. Therefore, for beneficial effects that can be achieved, refer to beneficial effects in a corresponding method, and details are not described herein again.

It may be understood that the electronic device according to the fifth aspect, the computer storage medium according to the eighth aspect, or the computer program product according to the eleventh aspect is configured to perform the photographing method according to the second aspect. Therefore, for beneficial effects that can be achieved, refer to beneficial effects in a corresponding method, and details are not described herein again.

It may be understood that the electronic device according to the sixth aspect, the computer storage medium according to the ninth aspect, or the computer program product according to the twelfth aspect is configured to perform the input method according to the third aspect. Therefore, for beneficial effects that can be achieved, refer to beneficial effects in a corresponding method, and details are not described herein again.

DESCRIPTION OF EMBODIMENTS

The following clearly describes technical solutions in the embodiments of this application in detail with reference to the accompanying drawings.

In the embodiments of this application, a pressing duration threshold value (referred to as a threshold value for short in the following embodiments) that is applicable to a long press operation and a short press operation of each of different users may be calculated for the user, and based on the threshold value, an operation entered by the user is accurately recognized, so that a correct response is made. This improves input efficiency of the user.

An electronic device in the embodiments of this application may be a portable mobile terminal, for example, a mobile phone, a tablet computer, a netbook, a personal digital assistant (PDA), a wearable electronic device (such as a smart band or a smartwatch), or a virtual reality device.

Next, an example electronic device provided in the following embodiments of this application is described.

Figure 1:
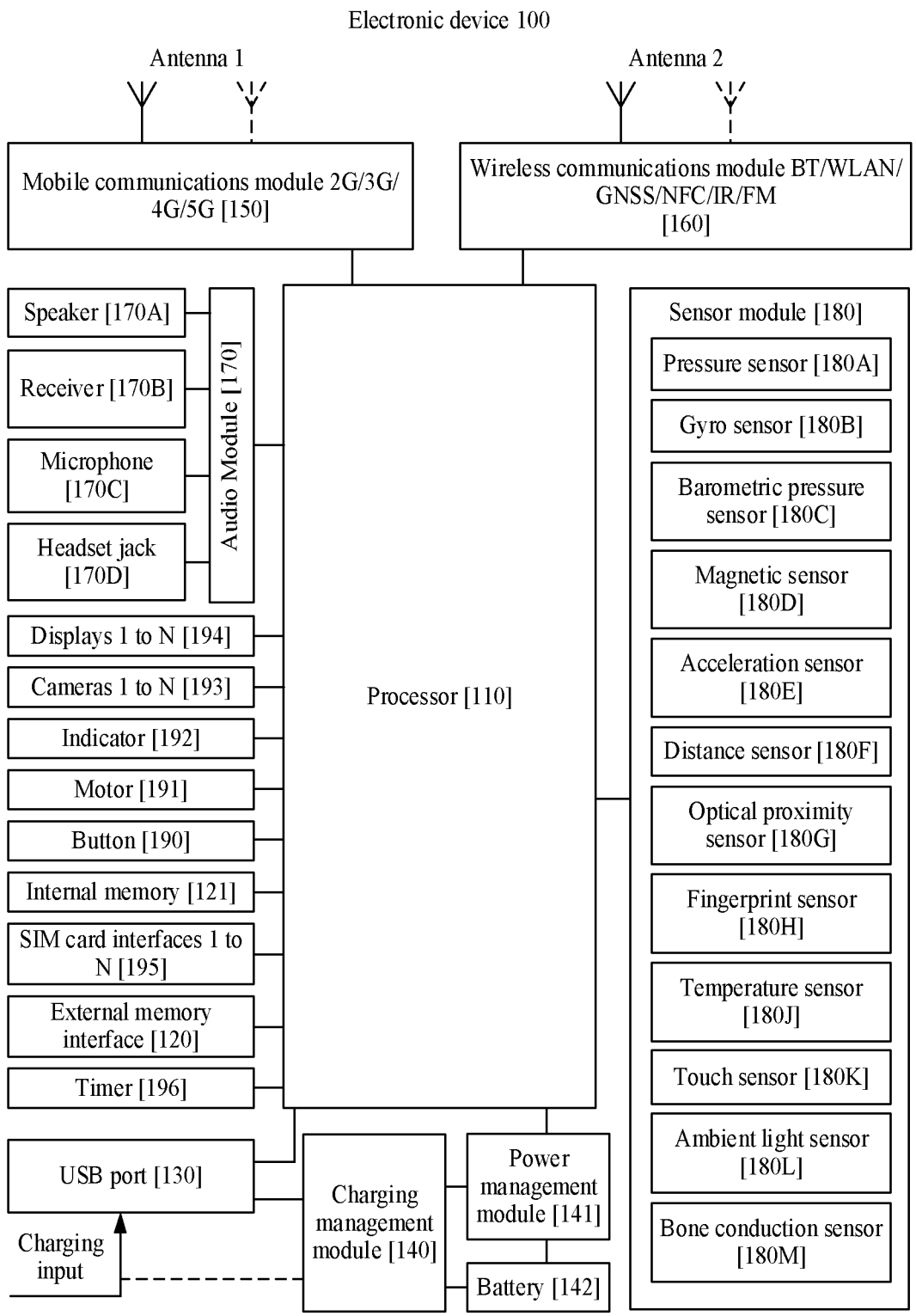
FIG. 1 is a schematic diagram of a structure of an electronic device according to an embodiment of this application.

FIG. 1 is a schematic diagram of a structure of an electronic device 100.

The electronic device 100 may include a processor 110, an external memory interface 120, an internal memory 121, a universal serial bus (USB) port 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (SIM) card interface 195, a timer 196, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of the present disclosure does not constitute a specific limitation on the electronic device 100. In some other embodiments of this application, the electronic device 100 may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, and/or a neural-network processing unit (NPU). Different processing units may be independent components, or may be integrated into one or more processors.

The controller may generate an operation control signal based on instruction operation code and a time sequence signal, to complete control of instruction fetching and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor 110 may directly invoke the instructions or the data from the memory. This avoids repeated access and reduces waiting time of the processor 110, thereby improving system efficiency. In this embodiment of this application, the processor 110 may be configured to calculate, based on a user characteristic, a threshold value applicable to a user, and further determine, based on the threshold value, whether a pressing operation entered by the user is a long press operation or a short press operation, and make an accurate response.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (, MIPI), a general-purpose input/output (GPIO) interface, a SIM interface, a USB port, and/or the like.

The USB port 130 is an interface that complies with a USB standard specification, and may be a mini USB port, a micro USB port, a USB Type-C port, or the like. The USB port 130 may be configured to connect to a charger to charge the electronic device 100, or may be configured to transmit data between the electronic device 100 and a peripheral device, or may be configured to connect to a headset to play audio through the headset. Alternatively, the port may be configured to connect to another electronic device, for example, an augmented reality (AR) device.

It may be understood that an interface connection relationship between the modules that is shown in this embodiment of the present disclosure is merely an example for description, and does not constitute a limitation on the structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive charging input from the charger. The charger may be a wireless charger or a wired charger. In some embodiments in which wired charging is used, the charging management module 140 may receive charging input from the wired charger through the USB port 130. In some embodiments in which wireless charging is used, the charging management module 140 may receive wireless charging input through a wireless charging coil of the electronic device 100. The charging management module 140 may further supply power to the electronic device by using the power management module 141 when the battery 142 is charged.

The power management module 141 is configured to connect the battery 142 and the charging management module 140 to the processor 110. The power management module 141 receives input from the battery 142 and/or the charging management module 140, and supplies power to the processor 110, the internal memory 121, the display 194, the camera 193, the wireless communications module 160, and the like. The power management module 141 may be further configured to monitor parameters such as a battery capacity, a quantity of battery cycles, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communications function of the electronic device 100 may be implemented through the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the electronic device 100 may be configured to cover one or more communication frequency bands. Different antennas may further be multiplexed to improve antenna utilization. For example, the antenna 1 may be multiplexed as a diversity antenna of a wireless local area network. In some other embodiments, the antenna may be used in combination with a tuning switch.

The mobile communications module 150 may provide a solution, applied to the electronic device 100, to wireless communication including second generation (2G), third generation (3G), fourth generation (4G), fifth generation (5G), or the like. The mobile communications module 150 may include at least one filter, a switch, a power amplifier, a low-noise amplifier (LNA), and the like. The mobile communications module 150 may receive an electromagnetic wave through the antenna 1, perform processing such as filtering and amplification on the received electromagnetic wave, and transmit the electromagnetic wave to the modem processor for demodulation. The mobile communications module 150 may further amplify a signal modulated by the modem processor, and convert the signal into an electromagnetic wave for radiation through the antenna 1. In some embodiments, at least some function modules of the mobile communications module 150 may be disposed in the processor 110. In some embodiments, at least some function modules of the mobile communications module 150 and at least some modules of the processor 110 may be disposed in a same device.

The modem processor may include a modulator and a demodulator. The modulator is configured to modulate a to-be-sent low-frequency baseband signal into a medium or high-frequency signal. The demodulator is configured to demodulate a received electromagnetic wave signal into a low-frequency baseband signal. Then, the demodulator transmits the low-frequency baseband signal obtained through the demodulation to the baseband processor for processing. The low-frequency baseband signal is processed by the baseband processor, and then transmitted to the application processor. The application processor outputs a sound signal by using an audio device (which is not limited to the speaker 170A, the receiver 170B, or the like), or displays an image or a video through the display 194. In some embodiments, the modem processor may be an independent component. In some other embodiments, the modem processor may be independent of the processor 110, and is disposed in a same device as the mobile communications module 150 or another function module.

The wireless communications module 160 may provide a wireless communication solution that includes a wireless local area network (WLAN) (for example, a Wi-Fi network), BLUETOOTH (BT), a global navigation satellite system (GNSS), frequency modulation (FM), a near field communication (NFC) technology, an infrared (IR) technology, or the like and that is applied to the electronic device 100. The wireless communications module 160 may be one or more devices integrating at least one communications processing module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

The electronic device 100 implements a display function by using the GPU, the display 194, the application processor, and the like. The GPU is a microprocessor for image processing, and is connected to the display 194 and the application processor. The GPU is configured to perform mathematical and geometric calculation, and perform graphics rendering. The processor 110 may include one or more GPUs that execute program instructions to generate or change display information.

The display 194 is configured to display an image, a video, and the like. The display 194 includes a display panel. The display panel may be a liquid-crystal display (LCD), an organic light-emitting diode (OLED), an active-matrix OLED (AMOLED), a flexible LED FLED), a mini LED, a micro LED, a micro OLED, a quantum dot LED (QD-LED), or the like. In some embodiments, the electronic device 100 may include one or N displays 194, where N is a positive integer greater than 1. In this embodiment of this application, the display 194 may display a corresponding user interface based on a type of the pressing operation entered by the user.

The electronic device 100 can implement a photographing function by using the ISP, the camera 193, the video codec, the GPU, the display 194, the application processor, and the like.

The ISP is configured to process data fed back by the camera 193. For example, during photographing, a shutter is pressed, a ray of light is transmitted to a photosensitive element of the camera through a lens, and an optical signal is converted into an electrical signal. The photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected to the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP to convert the electrical signal into a digital image signal. The ISP outputs the digital image signal to a DSP for processing. The DSP converts the digital image signal into an image signal of a standard format such as RGB or YUV. In some embodiments, the electronic device 100 may include one or N cameras 193, where N is a positive integer greater than 1. In this embodiment of this application, the camera 193 may respond based on a type of a pressing operation entered by the user on the photographing control. For example, when the user enters a long press operation on the photographing control, the camera 193 may photograph a plurality of photos at a preset frequency. When the user enters a short press operation on the photographing control, the camera 193 may shoot one photo.

The digital signal processor is configured to process a digital signal. In addition to the digital image signal, the digital signal processor may further process another digital signal. For example, when the electronic device 100 selects a frequency, the digital signal processor is configured to perform Fourier transform and the like on frequency energy.

The video codec is configured to compress or decompress a digital video. The electronic device 100 may support one or more video codecs. In this way, the electronic device 100 can play or record videos of a plurality of coding formats, for example, Moving Picture Experts Group (MPEG)-1, MPEG-2, MPEG-3, and MPEG-4.

The NPU is a neural-network (NN) computing processor, quickly processes input information by referring to a structure of a biological neural network, for example, by referring to a transfer mode between human brain neurons, and may further continuously perform self-learning. Applications such as intelligent cognition of the electronic device 100, for example, image recognition, facial recognition, speech recognition, and text understanding, can be implemented through the NPU.

The external memory interface 120 may be configured to be connected to an external memory card such as a micro secure digital (SD) card, to extend a storage capability of the electronic device 100. The external memory card communicates with the processor 110 through the external memory interface 120, to implement a data storage function. For example, files such as music and videos are stored in the external memory card.

The internal memory 121 may be configured to store computer-executable program code. The executable program code includes instructions. The internal memory 121 may include a program storage area and a data storage area. The program storage area may store an operating system, an application required by at least one function (for example, a voice playing function or an image playing function), and the like. The data storage area may store data (such as audio data and a phone book) created during use of the electronic device 100, and the like. In addition, the internal memory 121 may include a high-speed random access memory, and may further include a nonvolatile memory, for example, at least one magnetic disk storage device, a flash memory device, or a universal flash storage (UFS). The processor 110 runs the instructions stored in the internal memory 121 and/or the instructions stored in the memory disposed in the processor, to perform various function applications of the electronic device 100 and data processing.

The electronic device 100 may implement audio functions by using the audio module 170, the speaker 170A, the receiver 170B, the microphone 170C, the headset jack 170D, the application processor, and the like, for example, implement a music playback function and a recording function.

The audio module 170 is configured to convert digital audio information into an analog audio signal for output, and is also configured to convert analog audio input into a digital audio signal. The audio module 170 may further be configured to code and decode an audio signal. In some embodiments, the audio module 170 may be disposed in the processor 110, or some function modules of the audio module 170 are disposed in the processor 110.

The speaker 170A, also referred to as a "loudspeaker", is configured to convert an audio electrical signal into a sound signal. The electronic device 100 may listen to music or answer a hands-free call by using the speaker 170A.

The receiver 170B, also referred to as an "earpiece", is configured to convert an audio electrical signal into a sound signal. When a call is answered or speech information is received by using the electronic device 100, the receiver 170B may be put close to a human ear to listen to a speech.

The microphone 170C, also referred to as a "mike" or a "mic", is configured to convert a sound signal into an electrical signal. When making a call or sending speech information, a user may place the mouth of the user near the microphone 170C to make a sound, to input a sound signal to the microphone 170C. At least one microphone 170C may be disposed in the electronic device 100. In some other embodiments, two microphones 170C may be disposed in the electronic device 100, to collect a sound signal and further implement a noise reduction function. In some other embodiments, three, four, or more microphones 170C may alternatively be disposed in the electronic device 100, to collect a sound signal, reduce noise, further identify a sound source, implement a directional recording function, and the like.

The headset jack 170D is configured to connect to a wired headset. The headset jack 170D may be the USB port 130, or may be a 3.5 mm open mobile terminal platform (OMTP) standard interface or a cellular telecommunications industry association of the USA (CTIA) standard interface.

The pressure sensor 180A is configured to sense a pressure signal, and can convert the pressure signal into an electrical signal. In some embodiments, the pressure sensor 180A may be disposed on the display 194. In this embodiment of this application, the pressure sensor 180A may be configured to detect a pressure value of the pressing operation entered by the user, and then based on the pressure value, calculate a threshold value applicable to the user.

The gyro sensor 180B may be configured to determine a motion posture of the electronic device 100. In some embodiments, an angular velocity of the electronic device 100 around three axes (namely, x, y, and z axes) may be determined by using the gyro sensor 180B. The gyro sensor 180B may be used for image stabilization during photographing. For example, when a shutter is pressed, the gyro sensor 180B detects an angle at which the electronic device 100 jitters, obtains, through calculation based on the angle, a distance for which a lens module needs to compensate, and allows the lens to cancel the jitter of the electronic device 100 through reverse motion, to implement image stabilization. The gyro sensor 180B may be further used in a navigation scenario and a motion-sensing game scenario.

The barometric pressure sensor 180C is configured to measure barometric pressure.

The magnetic sensor 180D includes a Hall sensor. The electronic device 100 may detect opening and closing of a flip leather case by using the magnetic sensor 180D.

The acceleration sensor 180E may detect values of acceleration of the electronic device 100 in various directions (usually on three axes). When the electronic device 100 is still, a value and a direction of gravity may be detected. The acceleration sensor 180E may be further configured to identify a posture of the electronic device, and is applied to an application such as a pedometer.

The distance sensor 180F is configured to measure a distance. The electronic device 100 may measure a distance through infrared light or a laser.

For example, the optical proximity sensor 180G may include an LED and an optical detector, for example, a photodiode. The electronic device 100 may detect, by using the optical proximity sensor 180G, that the user holds the electronic device 100 close to an ear to make a call, to automatically perform screen-off for power saving. The optical proximity sensor 180G may also be configured to automatically unlock and lock a screen in a leather case mode and a pocket mode.

The ambient light sensor 180L is configured to sense ambient light brightness. The electronic device 100 may adaptively adjust brightness of the display 194 based on the sensed ambient light brightness. The ambient light sensor 180L may be further configured to automatically adjust a white balance during photographing. The ambient light sensor 180L may also cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature.

The touch sensor 180K is also referred to as a "touch control device". The touch sensor 180K may be disposed in the display 194, and the touch sensor 180K and the display 194 form a touchscreen, which is also referred to as a "touch screen". The touch sensor 180K is configured to detect a touch operation performed on or near the touch sensor 180K. The touch sensor may transfer the detected touch operation to the application processor, to determine a type of a touch event. The display 194 may provide visual output related to the touch operation. In some other embodiments, the touch sensor 180K may alternatively be disposed on a surface of the electronic device 100 and is at a position different from that of the display 194. In this embodiment of this application, the pressing operation entered by the user may be detected by using the touch sensor 180K.

The bone conduction sensor 180M may obtain a vibration signal.

The button 190 includes a power button, a volume button, and the like. The button 190 may be a mechanical button, or may be a touch button. The electronic device 100 may receive button input, and generate button signal input related to a user setting and function control of the electronic device 100.

The motor 191 may generate a vibration prompt. The motor 191 may be configured to provide an incoming call vibration prompt or a touch vibration feedback.

The indicator 192 may be an indicator light, may be configured to indicate a charging status and a power change, and may be configured to indicate a message, a missed call, a notification, and the like.

The SIM card interface 195 is configured to connect to a SIM card. The SIM card may be inserted into the SIM card interface 195 or detached from the SIM card interface 195, to implement contact with or detachment from the electronic device 100.

The timer 196 may be used for timing. In this embodiment of this application, the timer 196 may be configured to record pressing duration of the pressing operation entered by the user, so that the processor 110 determines, based on the pressing duration, whether the pressing operation entered by the user is a long press operation or a short press operation.

A software system of the electronic device 100 may use a hierarchical architecture, an event-driven architecture, a microkernel architecture, a microservice architecture, or a cloud architecture. In this embodiment of the present disclosure, an Android system of the hierarchical architecture is used as an example to describe the software structure of the electronic device 100.

Figure 2:
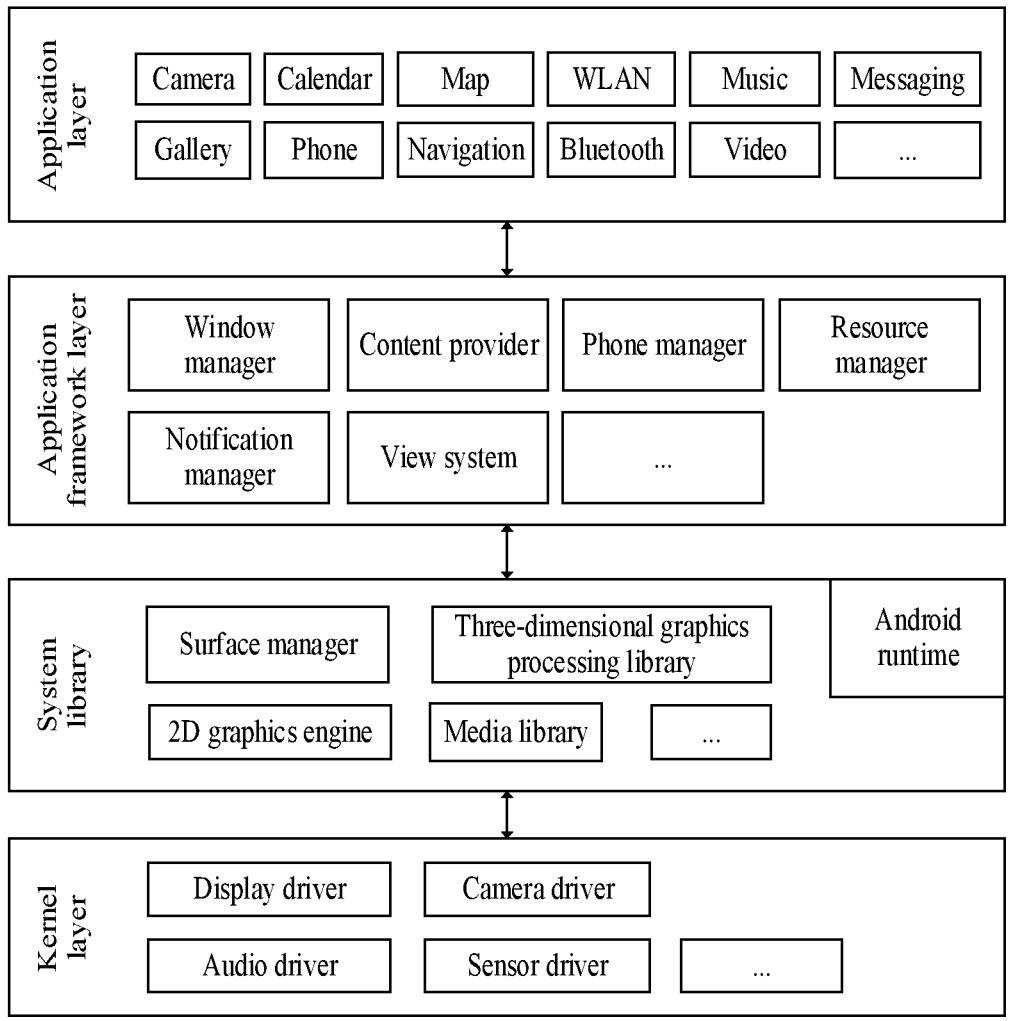
FIG. 2 is a block diagram of a software structure of an electronic device according to an embodiment of this application.

FIG. 2 is a block diagram of a software structure of the electronic device 100 according to an embodiment of the present disclosure.

In the hierarchical architecture, software is divided into several layers, and each layer has a clear role and responsibility. The layers communicate with each other through a software interface. In some embodiments, the Android system is divided into four layers, namely, an application layer, an application framework layer, an Android runtime and a system library, and a kernel layer from top to bottom.

The application layer may include a series of application packages.

As shown in FIG. 2, the application packages may include applications such as "camera", "gallery", "calendar", "phone", "map", "navigation", "WLAN", "BLUETOOTH", "music", "videos", and "messaging".

The application framework layer provides an application programming interface (API) and a programming framework for the applications at the application layer. The application framework layer includes some predefined functions.

As shown in FIG. 2, the application framework layer may include a window manager, a content provider, a view system, a phone manager, a resource manager, a notification manager, and the like.

The window manager is configured to manage a window program. The window manager may obtain a size of a display, determine whether there is a status bar, perform screen locking, take a screenshot, and the like.

The content provider is configured to store and obtain data, and enable the data to be accessed by an application. The data may include a video, an image, audio, calls that are made and received, a browsing history and a bookmark, an address book, and the like.

The view system includes visual controls such as a control for displaying a text and a control for displaying a picture. The view system may be configured to construct an application. A display interface may include one or more views. For example, a display interface including an SMS notification icon may include a text display view and a picture display view.

The phone manager is configured to provide a communication function of the electronic device 100, for example, management of a call status (including answering, declining, and the like).

The resource manager provides, for an application, various resources such as a localized character string, an icon, a picture, a layout file, and a video file.

The notification manager enables an application to display notification information in the status bar, and may be used to transmit a notification-type message. The displayed information may automatically disappear after a short pause without user interaction. For example, the notification manager is configured to notify download completion, give a message notification, and the like. The notification manager may alternatively be a notification that appears in a top status bar of the system in a form of a graph or a scroll bar text, for example, a notification of an application that is run on a background, or may be a notification that appears on the screen in a form of a dialog window. For example, text information is prompted in the status bar, a prompt tone is produced, the electronic device vibrates, or an indicator light blinks.

The Android runtime includes a kernel library and a virtual machine. The Android runtime is responsible for scheduling and management of the Android system.

The kernel library includes two parts: One part is a performance function that needs to be invoked by Java language, and the other part is an Android kernel library.

The application layer and the application framework layer are run on the virtual machine. The virtual machine executes Java files at the application layer and the application framework layer as binary files. The virtual machine is configured to perform functions such as object life cycle management, stack management, thread management, security and exception management, and garbage collection.

The system library may include a plurality of function modules, for example, a surface manager, a media library, a three-dimensional (3D) graphics processing library (for example, OpenGL embedded systems (ES)), and a two-dimensional (2D) graphics engine (for example, Scalable Graphics Library (SGL)).

The surface manager is configured to manage a display subsystem and provide fusion of 2D and 3D layers for a plurality of applications.

The media library supports playback and recording of a plurality of commonly used audio and video formats, static image files, and the like. The media library may support a plurality of audio and video coding formats such as MPEG-4, H.264, music player (MP)3, Augmentative and Alternative Communication (AAC), Adaptive Multi-rate (AMR), Joint Photographic Experts Group (JPG), and Portable Network Graphics (PNG).

The three-dimensional graphics processing library is used to implement three-dimensional graphics drawing, image rendering, compositing, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The following describes examples of working procedures of software and hardware of the electronic device 100 with reference to a photographing scenario.

When the touch sensor 180K receives a touch operation, a corresponding hardware interrupt is sent to the kernel layer. The kernel layer processes the touch operation into an original input event (including information such as touch coordinates and a timestamp of the touch operation). The original input event is stored at the kernel layer. The content provider of the application framework layer obtains the original input event from the kernel layer, and recognizes a control corresponding to the input event by using the view system. For example, the touch operation is a single-tap touch operation, and a control corresponding to the single-tap operation is a control of a camera application icon. A camera application invokes an interface at the application framework layer to enable the camera application, then enables a camera driver by invoking the kernel layer, and captures a static image or a video by using the camera 193.

Several application scenarios that may be related to the embodiments of this application are described below.

Scenario 1: A short press operation or a long press operation is entered on an icon of an application on the electronic device 100. The following uses an example in which the application is a camera for description.

Figure 3A:
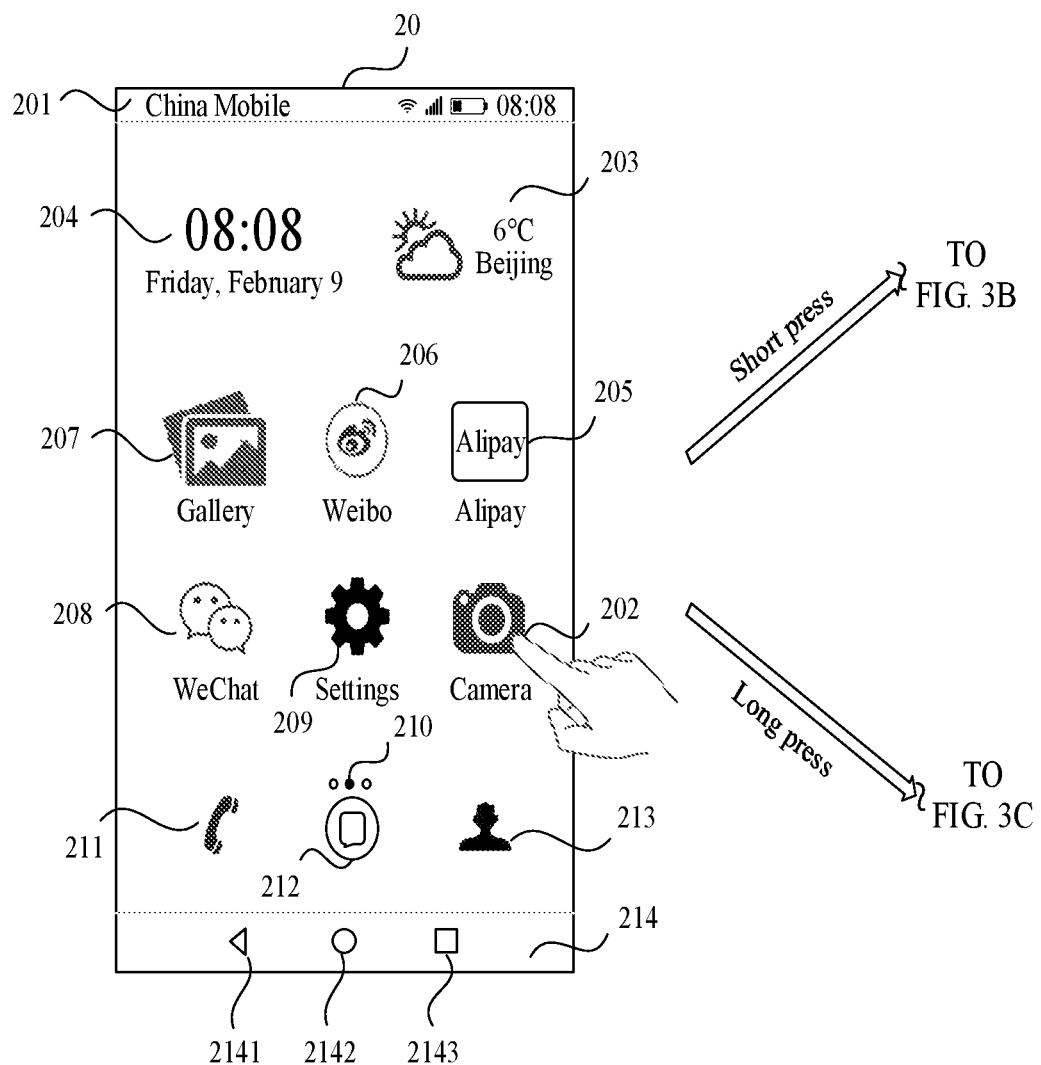
FIG. 3A, FIG. 3B, and FIG. 3C are schematic diagrams of an application scenario according to an embodiment of this application.

FIG. 3A shows an example of a user interface 20 for an application menu on the electronic device 100.

The user interface 20 may include a status bar 201, a time component icon 204, a weather component icon 203, and a plurality of application icons such as a camera icon 202, a WeChat icon 208, a settings icon 209, a gallery icon 207, a Weibo icon 206, an Alipay icon 205, and the like. The interface 20 may further include a page indicator 210, a phone icon 211, a messaging icon 212, a contacts icon 213, a navigation bar 214, and the like.

The status bar 201 may include an operator indicator (for example, an operator name "China Mobile"), one or more signal strength indicators of a Wi-Fi signal, one or more signal strength indicators of a mobile communication signal (also referred to as a cellular signal), and a battery status indicator.

The time component icon 204 may be used to indicate current time, such as a date, day of the week, and hour and minute information.

The weather component icon 203 may be used to indicate a weather type, such as cloudy to sunny or light rain, and may further be used to indicate information such as temperature.

The page indicator 210 may be used to indicate a specific page containing an application being browsed by a user. The user can swipe left or right in an area of a plurality of application icons to browse application icons on other pages.

The navigation bar 214 may include system navigation buttons such as a return button 2141, a home screen button 2142, and a task history display button 2143. A home screen is an interface displayed by the electronic device 100 after a user operation performed on the home screen button 2142 is detected in any user interface. When it is detected that a user taps the return button 2141, the electronic device 100 may display a previous user interface of a current user interface. When it is detected that the user taps the home screen button 2142, the electronic device 100 may display the home screen. When it is detected that the user taps the task history display button 2143, the electronic device 100 may display a task recently enabled by the user. The navigation buttons may have other names. For example, 2141 may be referred to as a Back Button, 2142 may be referred to as a Home button, and 2143 may be referred to as a Menu Button. This is not limited in this application. Each navigation button in the navigation bar 214 is not limited to a virtual button, and may be alternatively implemented as a physical button.

It can be understood that FIG. 3A shows only an example of a user interface on the electronic device 100, and should not constitute a limitation on this embodiment of this application.

Figure 3B:
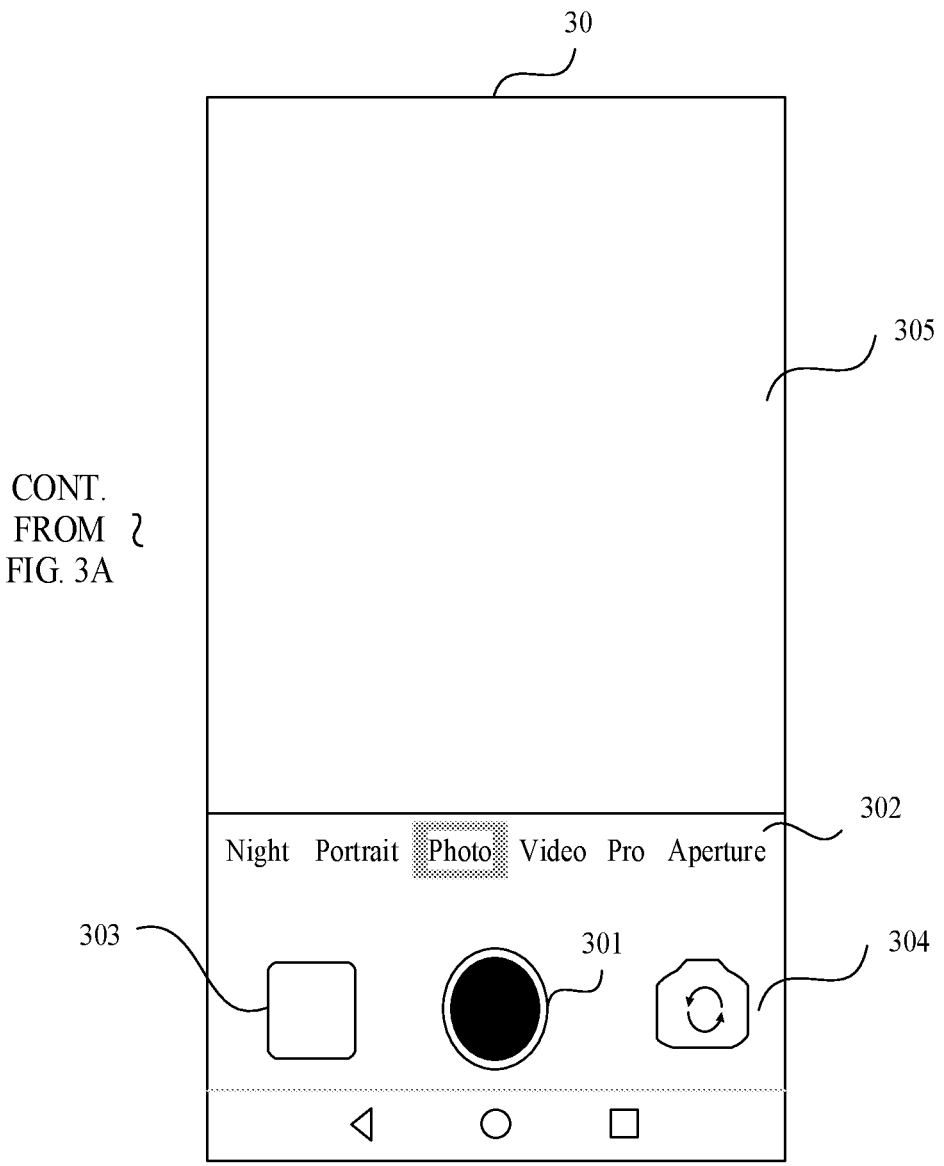

The electronic device 100 may detect a short press operation performed on the camera icon 202, and in response to the short press operation, the electronic device 100 may display a user interface 30 that is used to take a photo and that is shown in FIG. 3B.

The user interface 30 may include a photographing control 301, a photographing mode list 302, a control 303, a control 304, and a viewfinder frame 305.

The photographing control 301 may be configured to shoot a photo. The electronic device 100 may detect a user operation performed on the photographing control 301 (for example, a tap operation on the photographing control 301). In response to the operation, the electronic device 100 may determine a shot photo, and display a thumbnail of the shot photo in the control 303. In other words, the user may tap the photographing control 301 to trigger photographing. The photographing control 301 may be a button or a control in another form.

One or more photographing mode options may be displayed in the photographing mode list 302. The electronic device 100 may detect a user operation performed on a photographing mode option, and in response to the operation, the electronic device 100 may enable a photographing mode selected by the user. The electronic device may further detect a swipe operation (for example, a swipe operation to the left or right) in the photographing mode list 302, and in response to the operation, the electronic device 100 may switch the photographing mode options displayed in the photographing mode list 302, so that the user browses more photographing mode options. The photographing mode option may be an icon or an option in another form. Photographing modes may include a portrait photographing mode, a photo photographing mode, a video photographing mode, a night photographing mode, a professional photographing mode, an aperture photographing mode, and the like. Different photographing modes correspond to different photographing parameters.

The control 303 may be configured to open an album. The electronic device 100 may detect a user operation performed on the control 303 (for example, a tap operation on the control 303), and in response to the operation, the electronic device 100 may open the album to display a latest saved picture.

The control 304 can be configured to switch cameras. The electronic device 100 may detect a user operation performed on the control 304 (for example, a tap operation on the control 304). In response to the operation, the electronic device 100 may switch the cameras (for example, switch a rear-facing camera to a front-facing camera, or switch a front-facing camera to a rear-facing camera).

The viewfinder frame 305 may be configured to display a picture obtained by the camera 193. The electronic device 100 may refresh displayed content in the viewfinder frame in real time. The camera 193 configured to obtain a picture may be a rear-facing camera or a front-facing camera.

Figure 3C:
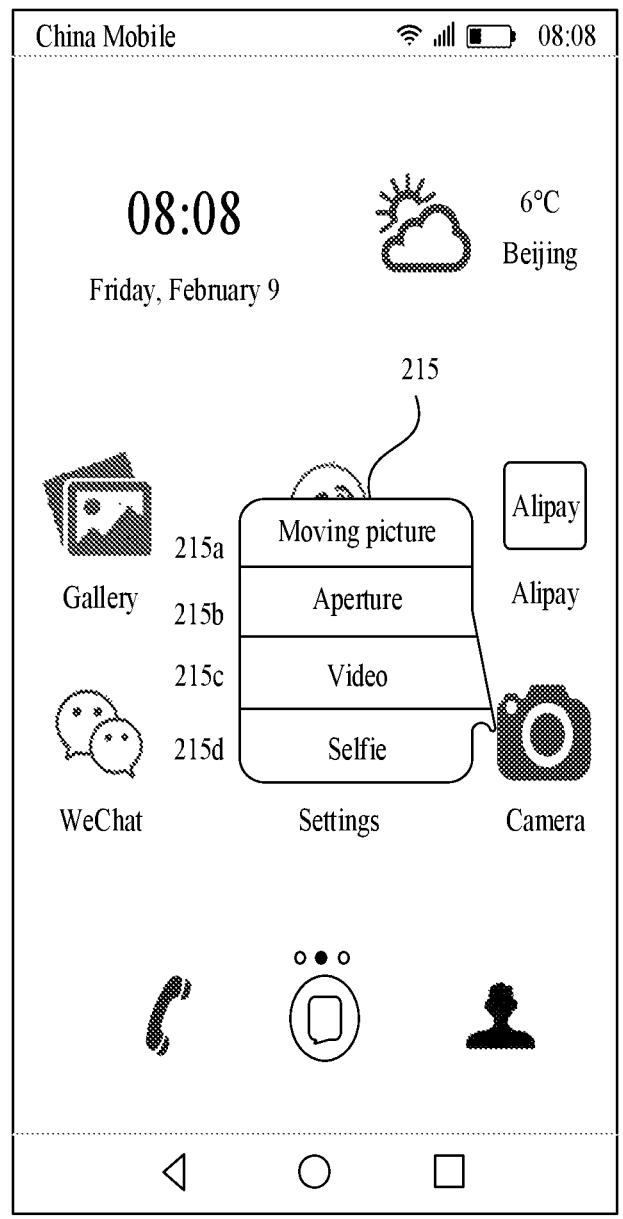

The electronic device 100 may detect a long press operation performed on the camera icon 202, and in response to the long press operation, the electronic device 100 may display, in the user interface 20, a function list 215 about the camera application shown in FIG. 3C.

The function list 215 may include one or more function options, for example, a moving picture option 215a, an aperture photographing option 215b, a video option 215c, and a selfie option 215d.

The moving picture option 215a may be used to enable shooting of a moving picture. The electronic device 100 may detect a user operation performed on the moving picture option 215a (for example, a tap operation on the moving picture option 215a), and in response to the operation, the electronic device 100 may display a user interface used to shoot a moving picture. The moving picture is a picture formed by combining a plurality of photos in a time sequence.

The aperture option 215b may be used to enable the aperture photographing mode. The electronic device 100 may detect a user operation performed on the aperture option 215b (for example, a tap operation on the aperture option 215b), and in response to the operation, the electronic device 100 may display a user interface used in the aperture photographing mode.

The video option 215c may be used to enable a recording function. The electronic device 100 may detect a user operation performed on the video option 215c (for example, a tap operation on the video option 215c), and in response to the operation, the electronic device 100 may display a user interface for recording.

The selfie option 215d may be used to enable selfie taking. The electronic device 100 may detect a user operation performed on the selfie option 215d (for example, a tap operation on the selfie option 215d), and in response to the operation, the electronic device 100 may display a user interface for taking a selfie.

It may be learned that the function options included in the function list 215 are examples for description, and may further include another function option in specific implementation. This is not limited in this embodiment of this application.

It may be learned that when the user enters a short press operation and a long press operation on another application icon other than the camera icon, for example, the Alipay icon 205, the electronic device 100 can make different responses. This is not limited in this embodiment of this application.

Scenario 2: A short press operation or a long press operation is entered on a photographing control 301.

Figure 4:
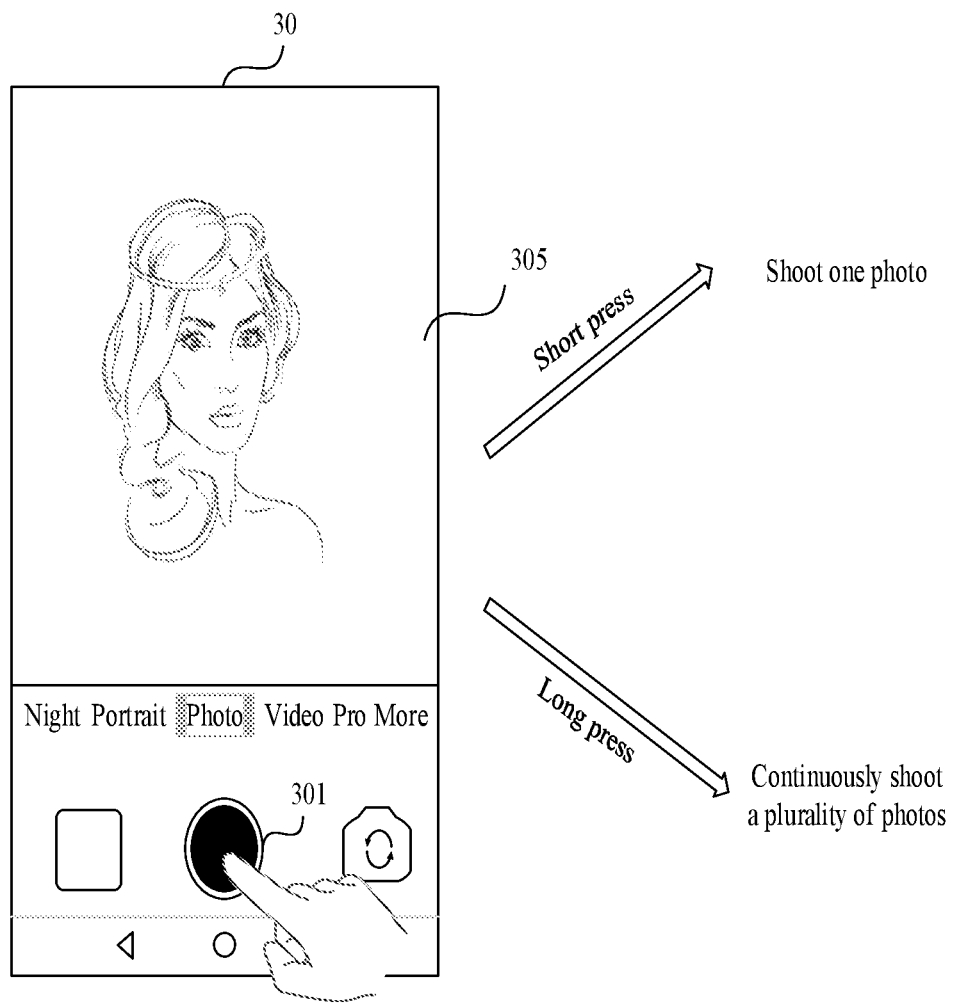
FIG. 4 is a schematic diagram of another application scenario according to an embodiment of this application.

As shown in FIG. 4, the electronic device 100 may detect the short press operation performed on the photographing control 301, and in response to the short press operation, the electronic device 100 may shoot one photo.

The electronic device 100 may detect the long press operation performed on the photographing control 301, and in response to the long press operation, the electronic device 100 may continuously shoot a plurality of photos until the electronic device 100 detects that the long press operation performed on the photographing control 301 ends. A frequency of shooting photos by the electronic device 100 may be, but is not limited to, 10 photos per second or 5 photos per second. A specific photographing frequency may be set by a user, or may be a default photographing frequency set by a manufacturer.

Scenario 3: A short press operation or a long press operation is entered on a thumbnail of a given photo in an album.

Figure 5A:
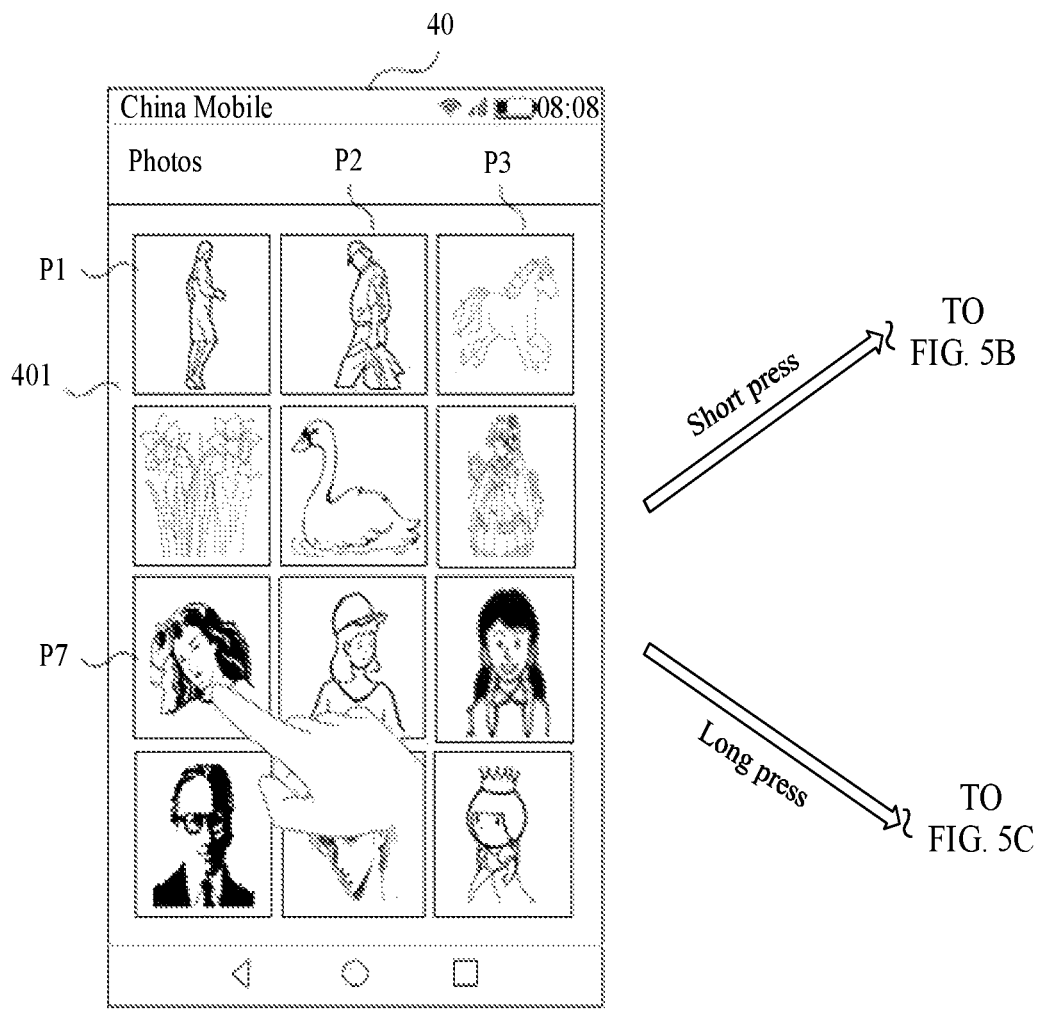
FIG. 5A, FIG. 5B, and FIG. 5C are schematic diagrams of another application scenario according to an embodiment of this application.

FIG. 5A shows a user interface 40 in the album for displaying a photo list. The electronic device 100 may display the user interface 40 after detecting a short press operation performed on the gallery icon 207 in the user interface 20.

The user interface 40 may include the photo list 401. The photo list 401 may be used to display thumbnails of photos stored in the internal memory 121 of the electronic device 100. A user may browse other thumbnails by entering a swipe operation in the user interface 40. A size of a thumbnail is less than a size of a photo corresponding to the thumbnail, and a quantity of pixels included in the thumbnail is less than a quantity of pixels of the photo corresponding to the thumbnail. FIG. 5A shows thumbnails of 12 photos as an example, separately labeled P1 to P12. FIG. 5A shows only P1, P2, P3, and P7 as an example, and other items are not shown. The following uses P7 as an example for description.

Figure 5B:
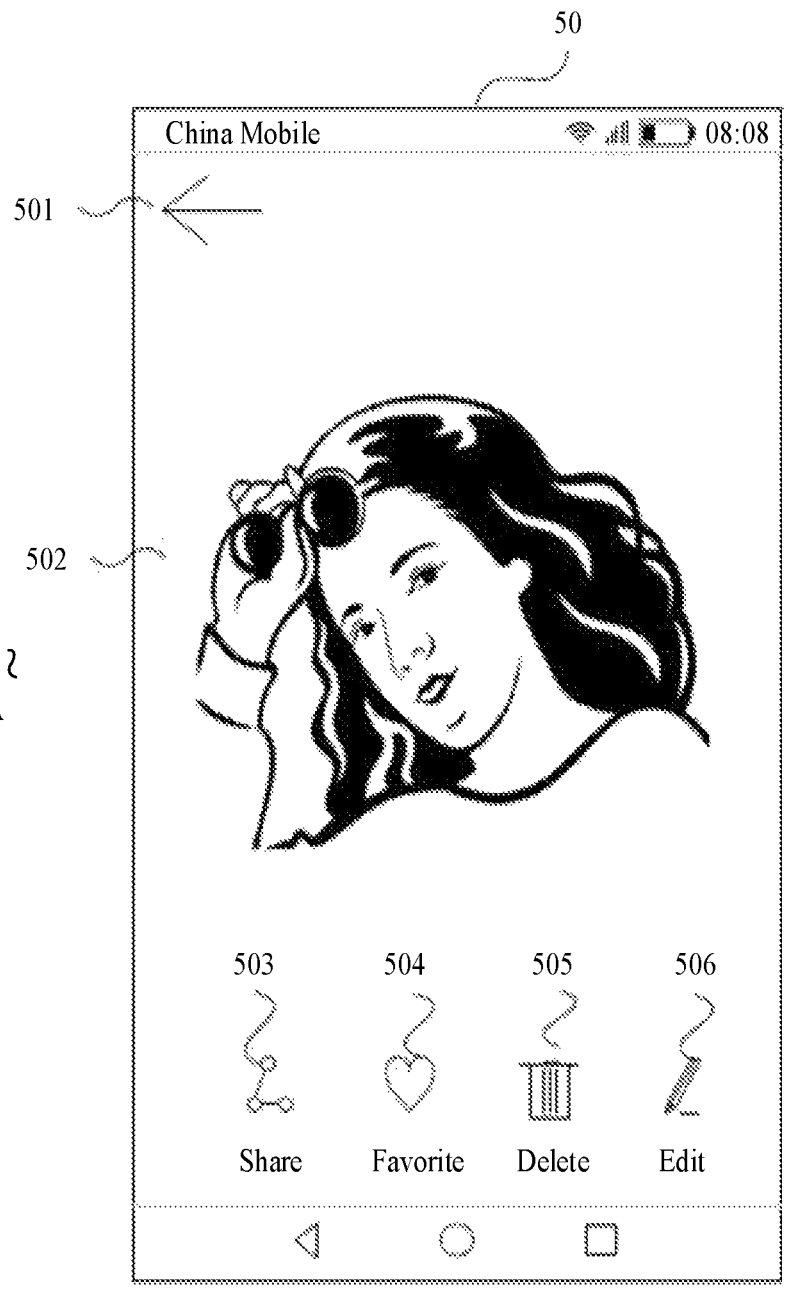

The electronic device 100 may detect a short press operation performed on P7, and in response to the short press operation, the electronic device 100 may display a user interface used to display a photo corresponding to P7, namely, a user interface 50 shown in FIG. 5B.

The user interface 50 may include a return control 501, a display area 502, a share control 503, a favorite control 504, a delete control 505, an edit control 506, a status bar, and a navigation bar.

The status bar is consistent with the status bar 201 in the user interface 20, and details are not described herein.

The navigation bar is consistent with the navigation bar 214 in the user interface 20, and details are not described herein.

The return control 501 may be configured to return to a previous user interface. The electronic device 100 may detect a user operation performed on the return control 501 (for example, a tap operation performed on the return control 501), and in response to the operation, the electronic device 100 may return to a previous user interface. The previous interface in this embodiment of this application is the user interface 40 shown in FIG. 5A.

The display area 502 may be configured to display the photo corresponding to the thumbnail P7.

The share control 503 may be configured to share a photo displayed in the display area 502. The electronic device 100 may detect a user operation performed on the share control 503 (for example, a tap operation performed on the share control 503), and in response to the operation, the electronic device 100 may display a user interface for sharing the photo.

The favorite control 504 may be configured to add a favorite tag to the photo displayed in the display area 502. The electronic device 100 may detect a user operation performed on the favorite control 503 (for example, a tap operation performed on the favorite control 504), and in response to the operation, the electronic device 100 may add the favorite tag to the photo displayed in the display area 502. On this basis, the electronic device 100 detects the tap operation performed on the favorite control 504 again, and in response to the operation, the electronic device 100 can delete the favorite tag of the photo.

The delete control 505 may be configured to delete the photo displayed in the display area 502 from the internal memory 121. The electronic device 100 may detect a user operation performed on the delete control 505 (for example, a tap operation performed on the delete control 505), and in response to the operation, the electronic device 100 may delete the photo from the internal memory 121.

The edit control 506 may be configured to edit the photo displayed in the display area 502. The electronic device 100 may detect a user operation performed on the edit control 506 (for example, a tap operation performed on the edit control 506), and in response to the operation, the electronic device 100 may receive a user operation used to edit the photo, for example, but not limited to adding a text to the photo, cropping the photo, or rotating the photo.

Figure 5C:
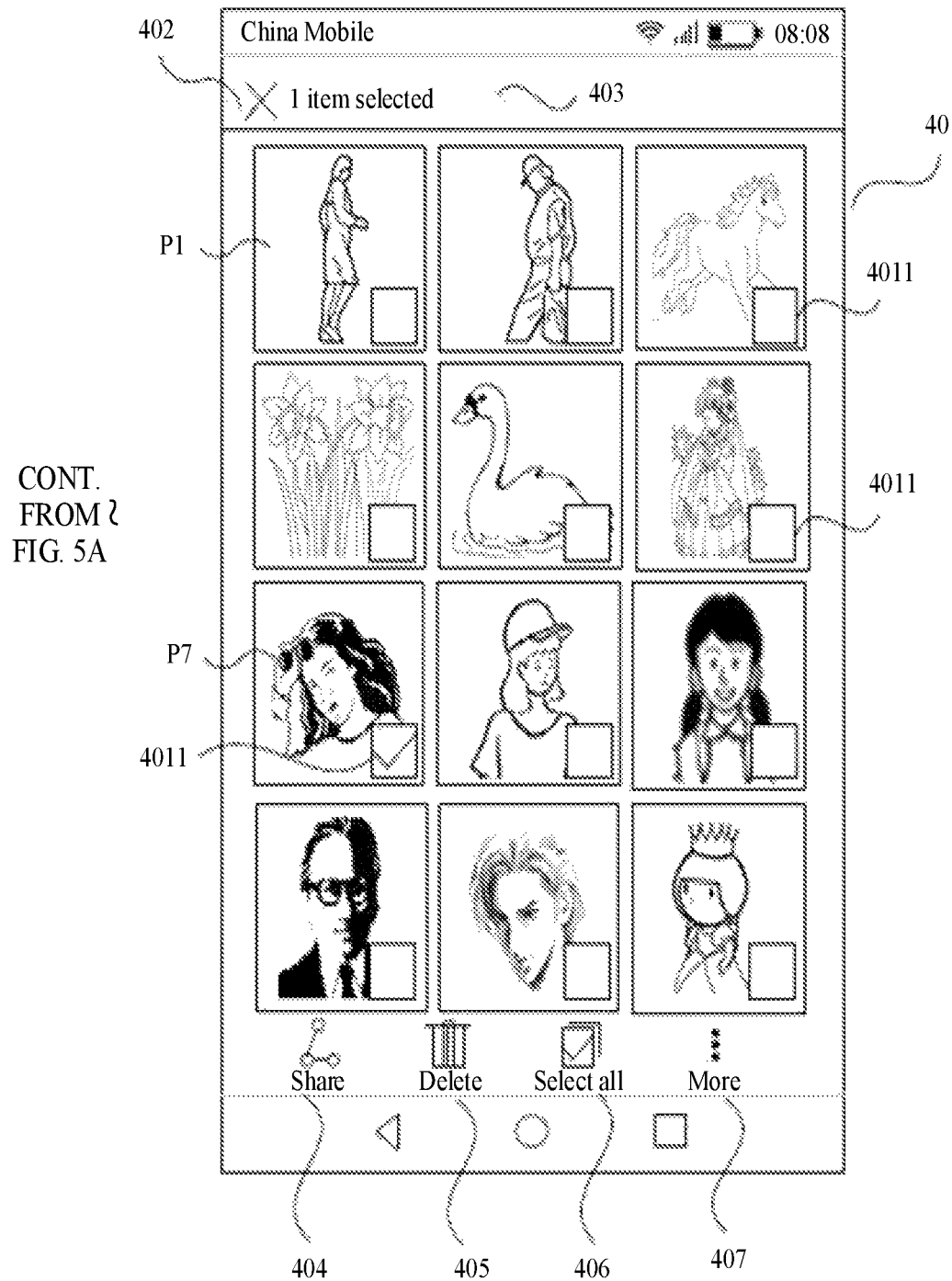

The electronic device 100 may detect a long press operation performed on P7, and in response to the long press operation, the electronic device 100 may display a user interface used to select a photo, namely, the user interface 40 shown in FIG. 5C.

The user interface 40 may include the photo list 401, a cancel control 402, a selection result indicator 403, the share control 404, the delete control 405, a select all control 406, and a more control 407.

Each thumbnail in the photo list 401 further includes a selection control 4011. The selection control 4011 may be configured to select a thumbnail of a photo corresponding to the selection control 4011. The electronic device 100 may detect a user operation performed on the selection control 4011 (for example, a tap operation on the selection control 4011), and in response to the operation, the electronic device 100 may display a result that the thumbnail is selected. A display manner in which the thumbnail is selected may be a manner in which a selected mark is displayed in the selection control 4011, and the mark may be, for example, "√" shown in FIG. 5C.

The cancel control 402 may be configured to cancel a selection on the thumbnail and display the user interface 40 shown in FIG. 5A. The electronic device 100 may detect a user operation performed on the cancel control 402 (for example, a tap operation on the cancel control 402), and in response to the operation, the electronic device 100 may cancel the selection on the thumbnail and display the user interface 40 shown in FIG. 5A.

The selection result indicator 403 may be used to indicate a result of a currently selected thumbnail, for example, "1 item selected" shown in FIG. 5C.

The share control 404 may be configured to share a photo corresponding to the selected thumbnail. The electronic device 100 may detect a user operation performed on the share control 404 (for example, a tap operation performed on the share control 404), and in response to the operation, the electronic device 100 may display a user interface used to share the photo corresponding to the selected thumbnail.

The delete control 405 may be configured to delete the photo corresponding to the selected thumbnail from the internal memory 121. The electronic device 100 may detect a user operation performed on the delete control 405 (for example, a tap operation performed on the delete control 405), and in response to the operation, the electronic device 100 may delete the photo corresponding to the selected thumbnail from the internal memory 121.

The select all control 406 may be configured to select each thumbnail in the photo list 401. The electronic device 100 may detect a user operation performed on the select all control 406 (for example, a tap operation performed on the select all control 406), and in response to the operation, the electronic device 100 may select each thumbnail in the photo list 401.

The more control 407 may be configured to display other function options such as but not limited to a download option, and a copy option. The electronic device 100 may detect a user operation performed on the more control 407 (for example, a tap operation performed on the more control 407), and in response to the operation, the electronic device 100 may display other function options.

It may be learned that the selection result shown in FIG. 5C is merely an example for description, and there may be another selection result in specific implementation. This is not limited in this embodiment of this application.

It may be learned that the foregoing enumerated three use scenarios are merely examples for description. In specific implementation, this embodiment of this application may be further applied to another scenario, for example, a short press operation or a long press operation is performed on a file in a file list. This is not limited in this embodiment of this application.

In the following embodiments of this application, a time threshold value used to distinguish whether a pressing operation is a long press operation or a short press operation is referred to as a threshold value for short, a pressing operation whose pressing duration is greater than or equal to the threshold value is a long press operation, and a pressing operation whose pressing duration is less than the threshold value is a short press operation (namely, a tapping operation). Because different users have different operation habits, threshold values applicable to different users are also different.

The following separately describes two threshold value calculation methods.

Method 1: Calculate a threshold value applicable to a user based on an age of the user and a pressure value (referred to as a touch pressure value below) of pressing a control by the user.

Further, adjustment duration based on a reference value is calculated based on the age of the user and the touch pressure value. A relationship among the threshold value, the age of the user, and the touch pressure value may be as follows:

$$\text{Time}=\text{basetime}+\theta(\alpha*F(\text{age})+\beta*F(\text{pressure})) \quad (1)$$

In formula (1), Time is a threshold value, basetime is a reference value, F(age) is adjustment duration corresponding to an age, F(pressure) is adjustment duration corresponding to a touch pressure value, $0<\theta<1$, $0<\alpha<1$, and $0<\beta<1$. Possibly, the reference value may be, but is not limited to, 400 milliseconds (ms). Possibly, a value of $\theta$ may be, but is not limited to, 0.08, a value of $\alpha$ may be, but is not limited to, 0.5, and a value of $\beta$ may be, but is not limited to, 0.5.

Table 1 shows an example of a relationship between an age of a user and adjustment duration F(age).

TABLE 1

| Age (years) | F(age) |
|---|---|
| 0 < age ≤ 60 | 0 ms |
| age > 60 | 100 ms |

It can be learned that in Table 1, the first column is an age category, and the second column is adjustment duration. The age category may include 0<age≤60, and age>60. Adjustment duration F(age) corresponding to 0<age≤60 is 0 ms, and adjustment duration F(age) corresponding to age>60 is 100 ms.

It can be learned that the foregoing age category is merely an example for description, and there may be another age category in specific implementation. This is not limited in this embodiment of this application.

It can be learned that the value of the adjustment duration F(age) corresponding to the age category is merely an example for description. In specific implementation, the age category may correspond to a value of another adjustment duration F(age), and the value of the adjustment duration F(age) is not limited to a non-negative number. In specific implementation, the value may alternatively be a negative number. This is not limited in this embodiment of this application.

Table 2 shows an example of a relationship between a touch pressure value pressure and adjustment duration F(pressure).

TABLE 2

| Pressure (Newton) | F(pressure) |
|---|---|
| 0 < pressure ≤ 0.7 | 0 ms |
| 0.7 < pressure ≤ 0.9 | 50 ms |
| pressure > 0.9 | 150 ms |

It can be learned that in Table 2, the first column is a touch pressure value category, and the second column is adjustment duration. The touch pressure value category may include 0<pressure≤0.7, 0.7<pressure≤0.9, and pressure>0.9. Adjustment duration F(pressure) corresponding to 0<pressure≤0.7 is 0 ms, adjustment duration F(pressure) corresponding to 0.7<pressure≤0.9 is 50 ms, and adjustment duration F(pressure) corresponding to pressure>0.9 is 150 ms.

For example, if an age of a user is greater than 60 years old, it can be learned from Table 1 that adjustment duration F(age) is 100 ms. If a touch pressure value pressure of the user is greater than 0.9, it can be learned from Table 2 that adjustment duration F(pressure) is 150 ms. It is assumed that in formula (1), the reference value basetime is 400 ms, $\theta=0.08$, $\alpha=0.5$, and $\beta=0.5$. In this case, a threshold value Time=400+0.08×(0.5×100+0.5×150)=410 ms can be calculated according to formula (1).

For example, if an age of a user is less than 60 years old, it can be learned from Table 1 that adjustment duration F(age) is 0 ms. If a touch pressure value of the user is 0.7<pressure≤0.9, it can be learned from Table 2 that adjustment duration F(pressure) is 50 ms. It is assumed that in formula (1), the reference value basetime is 400 ms, $\theta=0.08$, $\alpha=0.5$, and $\beta=0.5$. In this case, a threshold value Time=400+0.08×(0.5×0+0.5×50)=402 ms can be calculated according to formula (1).

It can be learned that the foregoing touch pressure value category is merely an example for description, and there may be another touch pressure value category in specific implementation. This is not limited in this embodiment of this application.

It can be learned that the value of the adjustment duration F(pressure) corresponding to the touch pressure value category is merely an example for description. In specific implementation, the touch pressure value category may correspond to a value of another adjustment duration F(pressure), and the value of the adjustment duration F(pressure) is not limited to a non-negative number. In specific implementation, the value may alternatively be a negative number. This is not limited in this embodiment of this application.

It is not limited to calculating the adjustment duration based on the reference value to obtain the threshold value. In specific implementation, the threshold value may be further directly determined based on the age of the user and the touch pressure value. This is not limited in this embodiment of this application.

The following describes how to determine an age category of the user.

Further, the electronic device 100 may perform age classification based on an image captured by a camera during face unlock. Further, age estimation may be performed on the face by using a convolutional neural network. A face image is input into a convolutional neural network system to calculate a probability that the face image belongs to each age category, and an age category with a largest probability is determined as an age category of the face image. The convolutional neural network may be an age classification model.

The following describes a training process of the age classification model. The training process of the age classification model may include at least the following steps:

Step 1: Determine a sample set. The sample set may include a plurality of face images and age categories corresponding to the face images.

Step 2: Set a standard face image corresponding to each age category.

Step 3: Compare face feature key points of the face images in the sample set with face feature key points of the standard face images, perform key point alignment and adjustment on the face images in the sample set, then, perform contour extraction on adjusted face images in the sample set to obtain face contour images, perform normalization processing on the face contour images, and input processed face contour images to the convolutional neural network system to train the classification model.

Further, the face feature key points include but are not limited to an eye contour, a mouth contour, an eyebrow contour, a face contour, a forehead contour, and the like. Possibly, the face image may include, but is not limited to, 88 face feature key points.

Further, the key point alignment and adjustment are used to compare the face image with the standard face corresponding to each age category, determine a standard face corresponding to an age category closest to the face image, and then perform rotation and translation on the face image by using an affine transformation, to adjust an angle and a position of a face in the face image to be consistent with those in the standard face image. This avoids errors caused by the angle or the position of the face in the face image.

Further, the contour extraction may be fitting a contour line of each part (for example, an eyebrow, an eye, or a mouth) of the face. Further, a wavelet transform may be performed on the adjusted face image, a high-frequency component is filtered, and denoising is performed, to obtain a frequency domain image of a low-frequency component, that is, the face contour image.

Further, the normalization processing may be used to perform normalization processing on the foregoing face contour images, to process the face contour images of different sizes into face contour images of a same size. This avoids errors caused by faces of different sizes.

After the model training is completed, the face images in the sample set may be sequentially input into the age classification model again, to compare whether a result output by the face classification model is consistent with an age category of the face image. If the result output by the age classification model is inconsistent with the age category of the face image, the face image is collected as a sample image, the foregoing step 1 to step 3 are performed again to perform calibration on the age classification model, until accuracy of a final output result exceeds a preset threshold, for example, 90%, and in this case, a final age classification model is obtained.

A network structure sequence of the age classification model provided in this embodiment of this application is an input layer, K sub-layers, a fully connected layer, and a softmax layer, where K is greater than or equal to 1.

The input layer may be used to receive an input face image to be recognized, where the input face image is YUV data, and the input layer may convert the input YUV data into RGB data.

The sub-layers may be used to perform convolution and normalization processing on the RGB data output by the input layer. The sub-layers may include a convolutional layer, an activation layer, and a normalization layer. A core size and an output size of each layer of the convolutional layer, the activation layer, and the normalization layer may be adjusted randomly, each layer has one piece of input and produces one piece of output, and the output of each layer is used as input of a next layer.

The fully connected layer may be used to fit a contour line of a face image.

The softmax layer is used to output an output result of age classification. The output result may be a probability of each age category. The probability of each age category belongs to [0, 1], and a sum of the probabilities of the age categories is 1. An age category with a largest probability is determined as an age category of an input face image.

For example, in this embodiment of this application, there may be two age categories: $0<\text{age}\leq 60$, and $\text{age}>60$. If a face image of a person is input into the foregoing age classification model, and a result output by the softmax layer is a probability corresponding to $0<\text{age}\leq 60$ is 80%, and a probability corresponding to $\text{age}>60$ is 20%, it is determined that a final age category of the face image is $0<\text{age}\leq 60$.

It is not limited to the foregoing enumerated age categories. In specific implementation, there may be other age categories such as $0<\text{age}>2$, $2<\text{age}\leq 6$, $6<\text{age}\leq 14$, $14<\text{age}<35$, $35<\text{age}\leq 60$, and $\text{age}>60$. A specific age category is not limited in this embodiment of this application.

It is not limited to the output age range. In specific implementation, the age range may be alternatively replaced with a text. For example, the age range $2<\text{age}\leq 6$ is replaced with child, or the age range $14<\text{age}\leq 35$ is replaced with youth. A specific expression form of the output result is not limited in this embodiment of this application.

It is not limited to the image captured by the camera during face unlock. In specific implementation, age recognition may be further performed based on an image captured by a camera when the user uses the front-facing camera to take a selfie. This is not limited in this embodiment of this application.

Possibly, the internal memory 121 of the electronic device 100 may store a face image of the owner for face unlock. The electronic device 100 may directly acquire the face image stored in the internal memory 121 and perform age recognition.

The following describes how to determine a touch pressure value.

Further, the electronic device 100 may detect the touch pressure value by using the pressure sensor 180A.

Further, touch pressure values may be classified into several ranges. For example, in this embodiment of this application, touch pressure values may be classified into three ranges: $0<\text{pressure}\leq 0.7$, $0.7<\text{pressure}\leq 0.9$, and $\text{pressure}>0.9$.

The touch pressure value used to calculate the threshold value in this embodiment of this application may be a result obtained by the electronic device 100 by collecting touch pressure values of the user in a period of time, or may be a touch pressure value obtained when the user taps a control for a single time.

Possibly, if the electronic device 100 collects the touch pressure values of the user in a period of time, a highest-frequency range to which the touch pressure values of the user in a period of time belong may be determined as a range to which the touch pressure value of the user belongs. Adjustment duration corresponding to the range to which the touch pressure value belongs may be determined according to Table 2, and then based on the adjustment duration, the threshold value is calculated. The touch pressure value calculated in this manner can meet a long-term use habit of the user. This avoids an inaccurate calculated touch pressure value caused by a single operation error.

For example, the electronic device 100 may detect a pressure value of a touch operation on any control by the user in one day. If the user inputs 100 touch operations in one day, and in the 100 touch operations, a range to which touch pressure values of 60 touch operations belong is $0.7<\text{pressure}\leq 0.9$, a range to which touch pressure values of 25 touch operations belong is $0<\text{pressure}\leq 0.7$, and a range to which touch pressure values of 15 touch operations belong is pressure>0.9, the electronic device 100 may determine 0.7<pressure≤0.9 as the range to which the touch pressure value of the user belongs. According to Table 2, it may be further determined that the adjustment duration F(pressure) corresponding to the touch pressure value of the user is 50 ms.

If the touch pressure value is a touch pressure value obtained when the user taps a control for a single time, when the user enters a touch operation, the electronic device 100 may calculate, in real time, a threshold value applicable to the current touch operation, and respond, based on a calculation result of the threshold value, to the touch operation entered by the user. In this manner, an accurate response can be made to each touch operation, and accuracy of a response of the electronic device to the touch operation is not affected by a change of users.

Possibly, the touch pressure value may be an average pressure value of pressing any control by the user in a period of time.

Further, the electronic device 100 may collect a pressure value of pressing any control by the user in a period of time. The period of time is, for example, but not limited to, one day. The electronic device 100 may record a quantity of times of pressing controls in a period of time by the user and a pressure value of pressing each control, and calculate a value that is obtained by dividing a sum of pressure values of pressing all controls by a value of the quantity of the pressing times, that is, calculate an average pressure value of pressing any control by the user in a period of time. The average pressure value is the touch pressure value.

The threshold value is related to, but not limited to, the age of the user and the touch pressure value. In specific implementation, the threshold value may be related only to the age of the user or only to the touch pressure value. This is not limited in this embodiment of this application.

Method 2: Calculate a threshold value applicable to a user based on a font size of the electronic device 100 and a pressure value (namely, a touch pressure value) of pressing a control by the user.

Further, for how to determine the touch pressure value, refer to a related part in method 1. Details are not described herein.

Further, to help an older user more clearly view content displayed on the electronic device 100, the older user usually sets a font of the electronic device 100 to a larger font. Therefore, the font size of the electronic device 100 may reflect the age of the user to some extent. It can be learned that the font size of the electronic device 100 may be set by the user, and the font size may usually include the following several types: huge, extra large, large, normal, and small. A character whose font type is huge occupies the largest area of a display, a character whose font type is extra large occupies the second large area of the display, and a character whose font type is small occupies the smallest area of the display.

Further, a relationship among the threshold value, the font size of the electronic device 100, and the pressure value of pressing the control by the user may be as follows:

$$\text{Time} = \text{basetime} + \theta(\alpha * F(\text{font}) + \beta * F(\text{pressure})) \quad (2)$$

In formula (2), Time is a threshold value, basetime is a reference value, F(font) is adjustment duration corresponding to a font, F(pressure) is adjustment duration corresponding to a touch pressure value, $0<\theta<1$, $0<\alpha<1$, and $0<\beta<1$. Possibly, the reference value may be, but is not limited to, 400 milliseconds (ms). Possibly, a value of $\theta$ may be, but is not limited to, 0.08, a value of $\alpha$ may be, but is not limited to, 0.5, and a value of $\beta$ may be, but is not limited to, 0.5.

Table 3 shows an example of a relationship between a font size font and adjustment duration F(font).

TABLE 3

| Font | F(font) |
|---|---|
| Huge | 500 ms |
| Extra large | 250 ms |
| Large | 0 ms |
| Normal | 0 ms |
| Small | 0 ms |

It can be learned that in Table 3, the first column is a font size category, and the second column is adjustment duration. The font size category may include huge, extra large, large, normal, and small. When the font type is huge, corresponding adjustment duration F(font) is 500 ms. When the font type is extra large, corresponding adjustment duration F(font) is 250 ms. When the font type is large, normal, or small, corresponding adjustment duration F(font) is 0 ms.

For example, if the font size is extra large, it can be learned from Table 3 that adjustment duration F(font) is 250 ms. If a touch pressure value of the user is 0.7<pressure≤0.9, it can be learned from Table 2 that adjustment duration F(pressure) is 50 ms. It is assumed that in formula (2), the reference value basetime is 400 ms, $\theta=0.08$, $\alpha=0.5$, and $\beta=0.5$. In this case, a threshold value Time=400+0.08×(0.5×250+0.5×50)=412 ms can be calculated according to formula (2).

For example, if the font size is normal, it can be learned from Table 3 that adjustment duration F(age) is 0 ms. If a touch pressure value of the user is 0<pressure≤0.7, it can be learned from Table 2 that adjustment duration F(pressure) is 0 ms. It is assumed that in formula (2), the reference value basetime is 400 ms, $\theta=0.08$, $\alpha=0.5$, and $\beta=0.5$. In this case, a threshold value Time=400+0.08×(0.5×0+0.5×0)=400 ms can be calculated according to formula (2).

For example, if the font size is huge, it can be learned from Table 3 that adjustment duration F(age) is 500 ms. If a touch pressure value of the user is pressure>0.9, it can be learned from Table 2 that adjustment duration F(pressure) is 150 ms. It is assumed that in formula (2), the reference value basetime is 400 ms, $\theta=0.08$, $\alpha=0.5$, and $\beta=0.5$. In this case, a threshold value Time=400+0.08×(0.5×500+0.5×150)=426 ms can be calculated according to formula (2).

It can be learned that the foregoing font size category is merely an example for description, and there may be more or less font types in specific implementation. This is not limited in this embodiment of this application.

It can be learned that the value of the adjustment duration F(font) corresponding to the font size category is merely an example for description. In specific implementation, the font size category may correspond to a value of another adjustment duration F(font), and the value of the adjustment duration F(font) is not limited to a non-negative number. In specific implementation, the value may alternatively be a negative number. This is not limited in this embodiment of this application.

The threshold value is related to, but not limited to, the font size and the touch pressure value. In specific implementation, the threshold value may be related only to the font size or only to the touch pressure value. This is not limited in this embodiment of this application.

This is not limited to the foregoing two enumerated methods. In specific implementation, the threshold value may alternatively be determined by both the age of the user and the font size.

This is not limited to the foregoing two enumerated methods. In specific implementation, the threshold value may alternatively be determined by all of the age of the user, the font size, and the touch pressure value. This is not limited in this embodiment of this application.

That is, the threshold value may be determined by at least one of the age of the user, the font size, and the touch pressure value.

Based on the foregoing enumerated scenario 2, the following describes a photographing method according to an embodiment of this application. The method may be applied to the electronic device 100 shown in FIG. 1, and a camera application may be installed on the electronic device 100.

Figure 6:
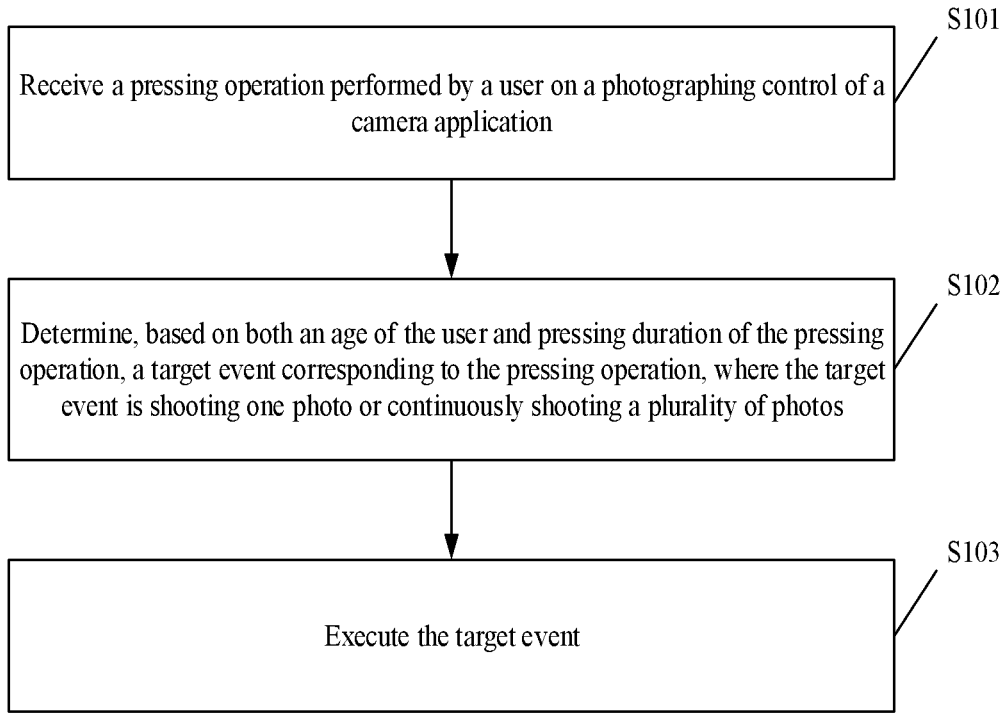
FIG. 6 is a schematic flowchart of a photographing method according to an embodiment of this application.

FIG. 6 shows an example of a schematic flowchart of a photographing method according to an embodiment of this application. As shown in FIG. 6, the photographing method may include at least the following steps.

S101: Receive a pressing operation performed by a user on a photographing control of the camera application.

Further, the electronic device 100 may detect, by using the touch sensor 180K, the pressing operation performed on the photographing control 301 of the camera application. The pressing operation may be classified into a long press operation and a short press operation based on pressing duration.

S102: Determine, based on both an age of the user and the pressing duration of the pressing operation, a target event corresponding to the pressing operation, where the target event is shooting one photo or continuously shooting a plurality of photos.

Further, in this embodiment of this application, different threshold values may be set for users of different ages. The threshold value may be used to distinguish whether a pressing operation is a long press operation or a short press operation. A pressing operation whose pressing duration is less than the threshold value is a short press operation, and a target event is shooting one photo. A pressing operation whose pressing duration is greater than or equal to the threshold value is a long press operation, and a target event is continuously shooting a plurality of photos.

A frequency of continuously shooting photos may be, but is not limited to, 10 photos per second or 5 photos per second. A specific photographing frequency may be set by a user, or may be a default photographing frequency that is set by a manufacturer.

S103: Execute the target event.

Possibly, the threshold value may be determined based on the age of the user and a touch pressure value. The touch pressure value may be an average pressure value of pressing any control by the user in a period of time.

Possibly, the threshold value may be determined based on the age of the user and a range to which a touch pressure value belongs. Further, pressure values of pressing any control by the user in a period of time may be classified into several ranges, and the range to which the touch pressure value belongs is a highest-frequency range to which pressure values of pressing any control by the user in the period of time belong.

For a specific process of determining the touch pressure value, refer to the description about how to determine the touch pressure value in the foregoing embodiments. Details are not described herein again.

The age of the user may be determined in two manners:

Manner 1: Obtain a face image of the user, and directly determine the age of the user based on the face image of the user.

Possibly, the face image may be obtained when the electronic device performs face unlock.

Possibly, a saved face image of an owner may be obtained from the internal memory 121, and the face image is used for face unlock.

Further, after the face image is obtained, the face image is input into a convolutional neural network, and then an age or age category corresponding to the face image is output. The convolutional neural network may be an age categorization model, and the model may be obtained by training a plurality of face images whose age categories are known. For a specific process, refer to the description about how to determine the age category of the user in the foregoing embodiments. Details are not described herein again.

Manner 2: Indirectly determine the age of the user by using a font size of the electronic device.

Further, the font size of the electronic device 100 may reflect the age of the user to some extent. In this embodiment of this application, that the age of the user is indirectly determined based on the font size of the electronic device may be that adjustment duration corresponding to the font size is determined based on the font size of the electronic device. The adjustment duration is set based on the age of the user that is reflected by the font size. Usually, a larger font may indicate an older user and longer reaction time required when the user presses the control, and therefore, corresponding adjustment duration is longer.

For a specific calculation manner of the threshold value, refer to the related descriptions about the calculation manner 1 and the calculation manner 2 of the threshold value in the foregoing embodiments. Details are not described herein again.

According to the input method provided in this embodiment of this application, it may be determined based on the age of the user and the pressing duration of the pressing operation whether the pressing operation entered by the user is a long press operation or a short press operation, and different reaction time is set for users of different ages. All users can enter a short press operation or a long press operation according to respective understandings of a duration definition, to enable a camera to shoot one photo or continuously shoot a plurality of photos. This improves photographing efficiency of the user.

Still based on the foregoing enumerated scenario 2, the following describes another photographing method according to an embodiment of this application. In the method, two users of different ages separately enter a pressing operation of same pressing duration to a photographing control of a camera application, so that the electronic device can make different responses.

Figure 7:
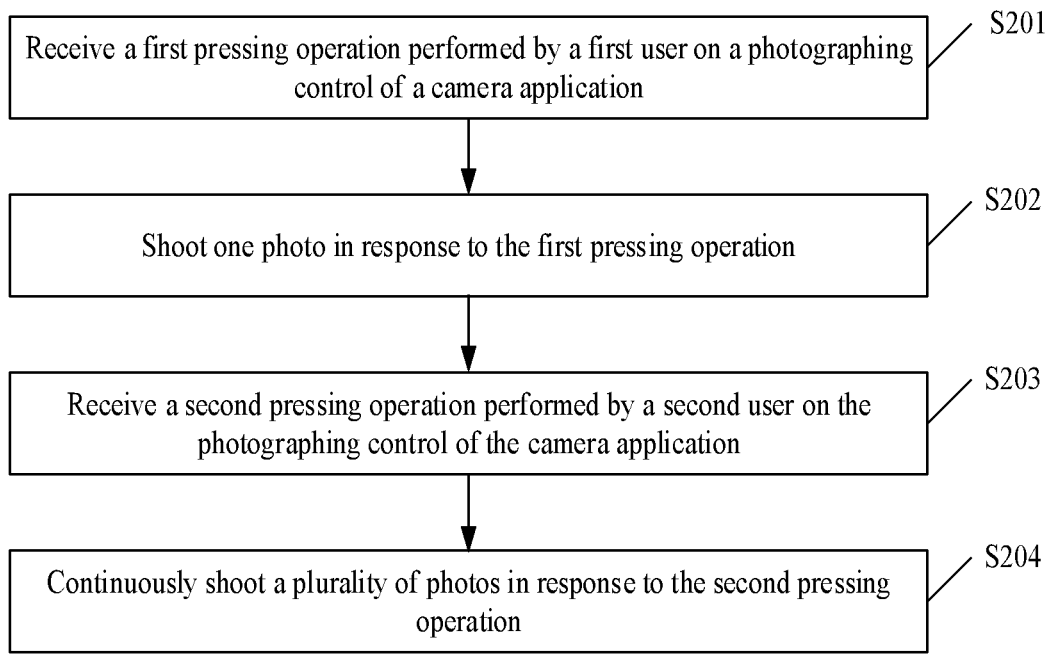
FIG. 7 is a schematic flowchart of another photographing method according to an embodiment of this application.

FIG. 7 shows an example of a schematic flowchart of another photographing method according to an embodiment of this application. As shown in FIG. 7, the photographing method may include at least the following steps.

Step S201: Receive a first pressing operation performed by a first user on the photographing control of the camera application.

Further, the electronic device 100 may detect, by using the touch sensor 180K, the first pressing operation performed on the photographing control 301 of the camera application.

Step S202: Shoot one photo in response to the first pressing operation.

Further, the first pressing operation is a short press operation, and the electronic device 100 can shoot one photo.

Step S203: Receive a second pressing operation performed by a second user on the photographing control of the camera application.

Further, the electronic device 100 may detect, by using the touch sensor 180K, the second pressing operation performed on the photographing control 301 of the camera application.

Step S204: Continuously shoot a plurality of photos in response to the second pressing operation.

Further, the second pressing operation is a long press operation, and the electronic device 100 can continuously shoot a plurality of photos.

An age of the first user is greater than an age of the second user, and pressing duration of the first pressing operation is the same as that of the second pressing operation. It can be learned that, in this embodiment of this application, after the two users of the different ages enter the pressing operations of the same pressing duration, the electronic device 100 can make different responses. After the older user enters the pressing operation, the electronic device can shoot one photo. After the younger user enters the pressing operation of the same duration, the electronic device can continuously shoot a plurality of photos.

Further, in this embodiment of this application, different threshold values may be set for users of different ages. A threshold value corresponding to the first user may be referred to as a first threshold value, and a threshold value corresponding to the second user may be referred to as a second threshold value. The first threshold value may be used to distinguish whether the first pressing operation is a long press operation or a short press operation. The second threshold value may be used to distinguish whether the second pressing operation is a long press operation or a short press operation.

It can be learned that the electronic device 100 may determine that the pressing duration of the first pressing operation is less than the first threshold value, determine that a first target event corresponding to the first pressing operation is shooting one photo, and execute the first target event. The electronic device 100 may determine that a second pressing duration is greater than or equal to the second threshold value, determine that a second target event corresponding to the second pressing operation is continuously shooting a plurality of photos, and execute the second target event.

A frequency of continuously shooting photos may be, but is not limited to, 10 photos per second or 5 photos per second. A specific photographing frequency may be set by a user, or may be a default photographing frequency set by a manufacturer.

Possibly, the first threshold value (or the second threshold value) may be determined based on the age of the first user (or the second user) and a first touch pressure value (or a second touch pressure value). The first touch pressure value (or the second touch pressure value) may be an average pressure value of pressing any control by the first user (or the second user) in a period of time.

Alternatively, the first threshold value (or the second threshold value) may be determined based on the age of the first user (or the second user) and a range to which a first touch pressure value (or a second touch pressure value) belongs. Further, pressure values of pressing any control by the first user (or the second user) in a period of time may be classified into several ranges, and the range to which the first touch pressure value (or the second touch pressure value) belongs is a highest-frequency range to which pressure values of pressing any control by the first user (or the second user) in the period of time belong.

For a specific process of determining the first touch pressure value (or the second touch pressure value), refer to the description about how to determine the touch pressure value in the foregoing embodiments. Details are not described herein again.

The age of the first user (or the second user) may be determined in two manners.

Manner 1: Obtain a face image of the first user (or the second user), and directly determine the age of the first user (or the second user) based on the face image of the first user (or the second user).

Possibly, the face image may be obtained when the electronic device 100 performs face unlock.

Alternatively, a saved face image of an owner may be obtained from the internal memory 121, and the face image is used for face unlock.

Further, after the face image is obtained, the face image is input into a convolutional neural network, and then an age or age category corresponding to the face image is output. The convolutional neural network may be an age classification model, and the model may be obtained by training a plurality of face images whose age categories are known. For a specific process, refer to the description about how to determine the age classification of the user in the foregoing embodiments. Details are not described herein again.

Manner 2: Indirectly determine the age of the first user (or the second user) by using a font size of the electronic device 100.

Further, the font size of the electronic device 100 may reflect the age of the user to some extent. In this embodiment of this application, that the age of the user is indirectly determined based on the font size of the electronic device may be that adjustment duration corresponding to the font size is determined based on the font size of the electronic device. The adjustment duration is set based on the age of the user that is reflected by the font size. Usually, a larger font may indicate an older user and longer reaction time required when the user presses the control, and therefore, corresponding adjustment duration is longer.

For a specific calculation manner of the first threshold value (or the second threshold value), refer to the related descriptions about the calculation manner 1 and the calculation manner 2 of the threshold value in the foregoing embodiments. Details are not described herein again.

It can be learned that the font size of the electronic device 100 may be set by the user. When the first user uses the electronic device 100, a font size of the electronic device 100 is a first font size. When the second user uses the electronic device 100, a font size of the electronic device 100 is a second font size. The first font size is greater than the second font size. A larger font size occupies a larger area of the display, and a smaller font size occupies a smaller area of the display. For example, the first font size may be extra large, and the second font size may be normal.

In this embodiment of this application, the two users of different ages enter the pressing operations of the same pressing duration, and the electronic device can make different responses. It is determined based on the age of the user whether the pressing operation entered by the user is a long press operation or a short press operation, and therefore, different reaction time is set for users of different ages. All users can enter a short press operation or a long press operation according to respective understandings of a duration definition, to enable a camera to shoot one photo or continuously shoot a plurality of photos. This improves photographing efficiency of the user.

The following describes a specific photographing method according to an embodiment of this application. An example in which a user enters a pressing operation on a photographing control is used for description.

Scenario Setting

It is assumed that the electronic device determines a threshold value based on an age of the user and a touch pressure value before receiving the pressing operation entered by the user on the photographing control. It is assumed that the electronic device performs age classification based on an image captured by a camera during face unlock, to recognize that the age of the user is greater than 60 years old. In this case, it can be learned that adjustment duration F(age)=100 ms by searching Table 1. It is assumed that a highest-frequency range to which the touch pressure value that is of the user in a period of time and that is collected by the electronic device belongs is 0.7<pressure≤0.9. In this case, it can be learned that adjustment duration F(pressure)=50 ms by searching Table 2. It is assumed that in formula (1), the reference value basetime is 400 ms, θ=0.08, α=0.5, and β=0.5. In this case, a threshold value Time=400+0.08×(0.5×100+0.5×50)=406 ms can be calculated according to formula (1).

Figure 8:
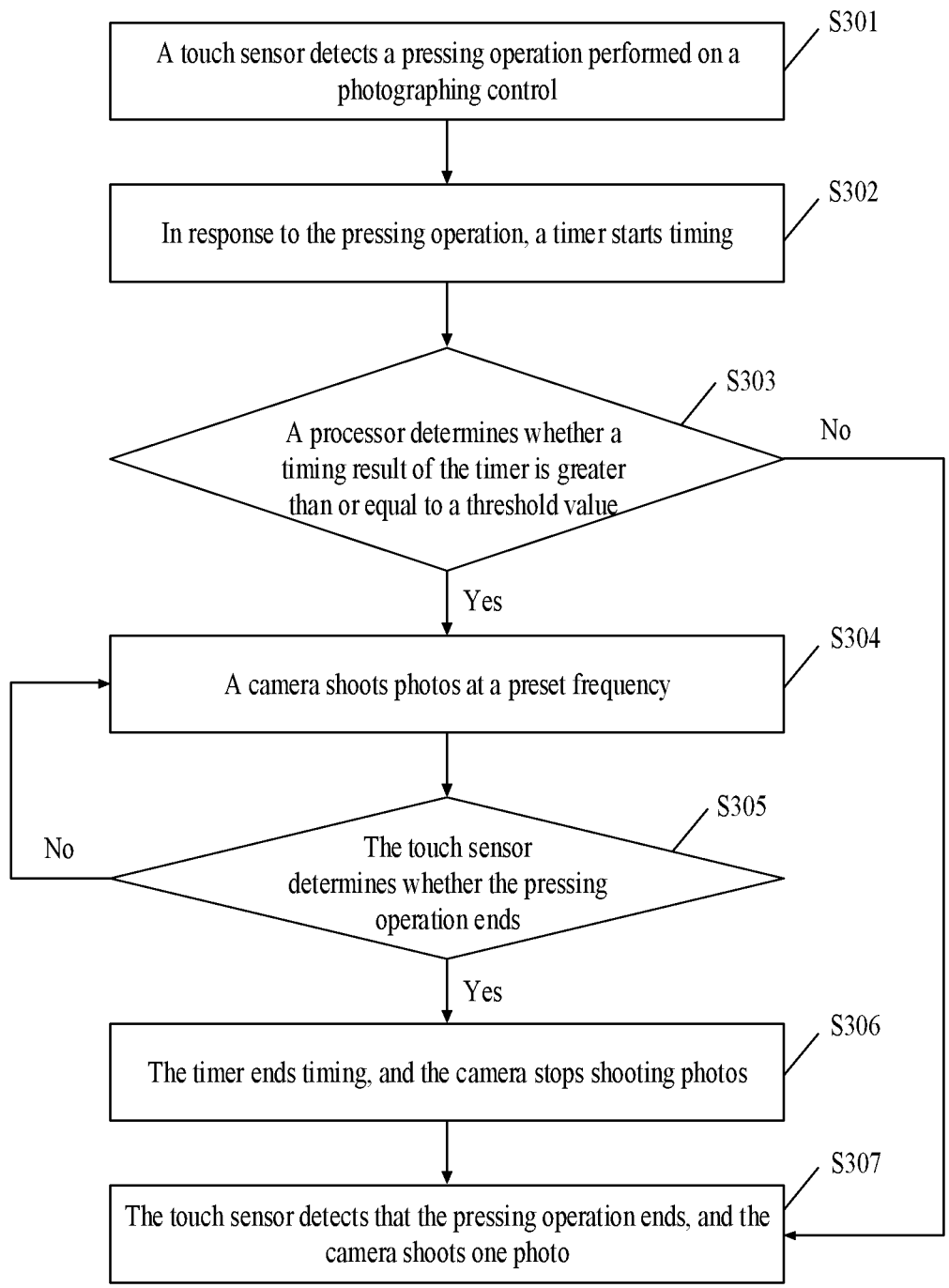
FIG. 8 is a schematic flowchart of an input method according to an embodiment of this application.

FIG. 8 shows an example of a schematic flowchart of a specific input method according to an embodiment of this application. As shown in FIG. 8, the input method may include the following steps.

Step S301: The touch sensor 180K detects a pressing operation performed on the photographing control 301.

Further, after detecting the pressing operation performed on the photographing control 301, the electronic device may shield monitoring of an original long press event of a system. Long press duration that is originally set by the system may be, for example, 400 ms (that is, if pressing duration of a pressing operation is greater than or equal to 400 ms, the pressing operation is considered as a long operation). In addition, the electronic device 100 may reset the long press duration, and modify the long press duration to a threshold value 406 ms that is calculated based on an age of a user and/or a touch pressure value. Further, the long press duration that is originally set by the system may be reset by using an internal rewriting triggering touch event onTouchEvent method.

Step S302: In response to the pressing operation, the timer 196 starts timing.

Step S303: The processor 110 determines whether a timing result of the timer 196 is greater than or equal to a threshold value. If yes, Step S304 is performed. If no, Step S307 is performed.

Further, the threshold value may be a value that is obtained by the processor 110 through calculation in advance based on an age of a user and a touch pressure value. For a specific example, refer to the foregoing scenario setting. The foregoing process of calculating the threshold value may be performed by the processor 110.

Step S304: The camera 193 shoots photos at a preset frequency.

Further, the preset frequency may be, for example, 10 photos per second or 5 photos per second. A specific photographing frequency may be set by the user, or may be a default photographing frequency set by an electronic device manufacturer.

Step S305: The touch sensor 180K determines whether the pressing operation ends. If yes, Step S306 is performed. If no, Step S304 is performed.

Step S306: The timer 196 ends timing, and the camera 193 stops shooting photos.

Further, after the pressing operation ends, the electronic device 100 may further reset a status of the photographing control 301 until a pressing operation performed on the control is detected again.

Step S307: The touch sensor 180K detects that the pressing operation ends, and the camera 193 shoots one photo.

Possibly, when detecting the pressing operation performed on the photographing control 301, the electronic device 100 may further detect a swipe operation. When detecting that the swipe operation moves out of an area of the control, the timer 196 may also stop timing. In this case, the electronic device 100 can make a response based on a timing result of the timer 196.

In this embodiment of this application, when the user enters a pressing operation on the photographing control, the electronic device may calculate, based on the age of the user and the touch pressure value of the user, a threshold value applicable to the user, and accurately determine an intention of the user according to a relationship between duration of the pressing operation entered by the user and the threshold value, so that the electronic device makes a correct response, to avoid an incorrect response that is made by the electronic device caused by an inaccurate understanding of operation duration by the user or an operation habit of the user. This improves input efficiency of the user and user experience.

Based on the foregoing enumerated three application scenarios, the following describes an input method according to an embodiment of this application.

Figure 9:
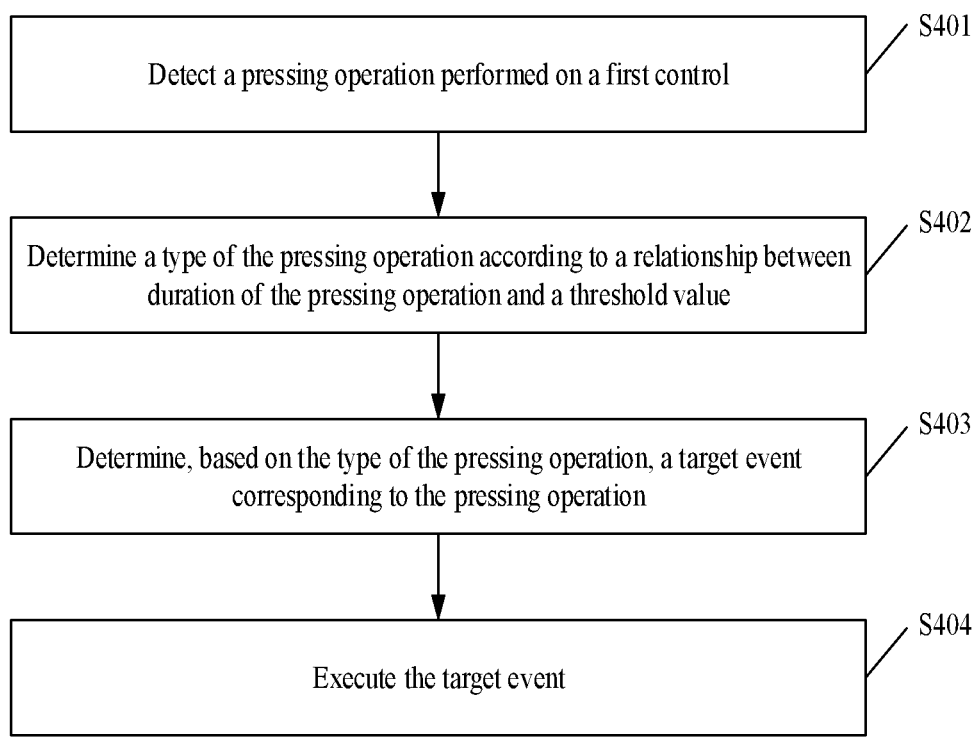
FIG. 9 is a schematic flowchart of another input method according to an embodiment of this application.

FIG. 9 is a schematic flowchart of an input method according to an embodiment of this application. As shown in FIG. 9, the input method may include at least the following steps.

S401: Detect a pressing operation performed on a first control.

Further, the first control may be the camera icon 202 in the embodiment in FIG. 3A, FIG. 3B, and FIG. 3C, or the photographing control 301 in the embodiment in FIG. 4, or a thumbnail of a photo in the embodiment in FIG. 5A, FIG. 5B, and FIG. 5C. In addition to the foregoing enumerated controls, the first control may be another control in specific implementation. This is not limited in this embodiment of this application.

S402: Determine a type of the pressing operation according to a relationship between duration of the pressing operation and a threshold value.

A type of the pressing operation includes a short press operation and a long press operation.

Possibly, the threshold value may be determined by an age of a user and a touch pressure value. The touch pressure value is an average pressure value of pressing any control by the user in a period of time. For details, refer to the related descriptions about how to determine the touch pressure value in the foregoing embodiments. Details are not described herein again.

Alternatively, the pressure value may be determined based on an age of a user and a range to which a touch pressure value belongs.

Further, pressure values of pressing any control by the user in a period of time may be classified into several ranges, and the range to which the touch pressure value belongs is a highest-frequency range to which pressure values of pressing any control by the user in the period of time belong. For details, refer to the related descriptions about how to determine the touch pressure value in the foregoing embodiments. Details are not described herein again.

The age of the user may be determined in two manners:

Manner 1: Obtain a face image of the user, and directly determine the age of the user based on the face image of the user.

Manner 2: Indirectly determine the age of the user by using a font size of the electronic device.

For a specific implementation, refer to the related descriptions in the embodiment in FIG. 6 or FIG. 7. Details are not described herein again.

For a specific calculation manner of the threshold value, refer to the related descriptions about the calculation manner 1 and the calculation manner 2 of the threshold value in the foregoing embodiments. Details are not described herein again.

Step S403: Determine, based on the type of the pressing operation, a target event corresponding to the pressing operation.

Further, if duration of the pressing operation is less than the foregoing threshold value, it is determined that the pressing operation is a short press operation. If duration of the pressing operation is greater than or equal to the foregoing threshold value, it is determined that the pressing operation is a long press operation. Different pressing operations correspond to different target events.

Possibly, the first control is the camera icon 202 in the embodiment in FIG. 3A, FIG. 3B, and FIG. 3C. When the pressing operation entered on the camera icon 202 is a short press operation, the target event corresponding to the pressing operation is turning on the camera 193, to display the user interface 30 shown in FIG. 3B. When the pressing operation entered on the camera icon 202 is a long press operation, the target event corresponding to the pressing operation is displaying, in the user interface 20, the function list 215 of the camera application that is shown in FIG. 3C.

Possibly, the first control is the photographing control 301 in the embodiment in FIG. 4. When the pressing operation entered on the photographing control 301 is a short press operation, the target event corresponding to the pressing operation is shooting one photo. When the pressing operation entered on the photographing control 301 is a long press operation, the target event corresponding to the pressing operation is continuously shooting a plurality of photos.

Possibly, the first control is the thumbnail P7 of the photo in the embodiment in FIG. 5A, FIG. 5B, and FIG. 5C. When the pressing operation entered on P7 is a short press operation, the target event corresponding to the pressing operation is displaying a user interface used to display the photo corresponding to P7, that is, the user interface 50 shown in FIG. 5B. When the pressing operation entered on P7 is a long press operation, the target event corresponding to the pressing operation is displaying a user interface used to select a photo, that is, the user interface 40 shown in FIG. 5C.

Step S404: Execute the target event.

In this embodiment of this application, the threshold value applicable to the user may be calculated based on the age of the user. A pressing operation whose pressing duration is greater than or equal to the threshold value is a long press operation, and a pressing operation whose pressing duration is less than the threshold value is a short press operation. The short press operation and the long press operation correspond to different target events. The type of the pressing operation entered by the user is determined based on the threshold value, to avoid that the electronic device cannot accurately recognize an intention of the user because users of different ages have different understandings of a duration definition, and to enable the electronic device to be capable of accurately responding to the pressing operation entered by the user. This reduces a probability that the electronic device makes an incorrect response, and improves user input efficiency and user experience.

An embodiment of this application further provides a computer-readable storage medium. The computer-readable storage medium stores instructions. When the instructions are run on a computer or a processor, the computer or the processor is enabled to perform one or more steps in any one of the foregoing methods.

All or some of the foregoing embodiments may be implemented by using software, hardware, firmware, or any combination thereof. When the software is used to implement the embodiments, all or some of the embodiments may be implemented in a form of a computer program product. The computer program product includes one or more computer instructions. When the computer program instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium, or may be transmitted by using the computer-readable storage medium. The computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

A person of ordinary skill in the art may understand that all or some of the processes of the methods in the embodiments may be implemented by a computer program instructing related hardware. The program may be stored in a computer-readable storage medium. When the program is run, the procedures of the methods in the embodiments may be performed. The storage medium includes any medium that can store program code, for example, a read-only memory (ROM), a random-access memory (RAM), a magnetic disk, or an optical disc.

What is claimed is:

1. A method comprising:
  receiving, from a user, a pressing operation on a photographing control of a camera application of an electronic device; and
  executing a target event corresponding to the pressing operation,
  wherein the target event is either shooting a photo or continuously shooting a plurality of photos depending on an age of the user and a pressing duration of the pressing operation,
  wherein the target event is shooting the photo when the pressing duration is less than a threshold value,
  wherein the threshold value is based on the age of the user and a touch pressure value,
  wherein the touch pressure value is an average pressure value of pressing a control by the user in a period of time, and wherein the target event is continuously shooting the plurality of photos when the pressing duration is greater than or equal to the threshold value.

2. The method of claim 1, wherein before executing the target event, the method further comprises obtaining a face image of the user wherein the age is further based on the face image.

3. The method of claim 1, wherein the age is further based on a font size of the electronic device.

4. The method of claim 1, wherein the pressing operation is a short press operation or a long press operation.

5. The method of claim 4, wherein the pressing operation is the short press operation when the pressing duration is less than the threshold value, and wherein the target event is shooting the photo when the pressing operation is the short press operation.

6. The method of claim 4, wherein the pressing operation is the long press operation when the pressing duration is greater than or equal to the threshold value, and wherein the target event is shooting the plurality of photos when the pressing operation is the long press operation.

7. The method of claim 1, wherein the touch pressure value indicates the age of the user.

8. A method comprising:
receiving, from a first user, a first pressing operation performed on a photographing control of a camera application of an electronic device;
executing a first target event corresponding to a first pressing operation, wherein the first target event is shooting a photo depending on a first age of the first user and a first pressing duration of the first pressing operation, wherein the first target event is shooting the photo when a first threshold value is greater than the first pressing duration, wherein the first threshold value is based on the first age and a first touch pressure value, and wherein the first touch pressure value is a first average pressure value of pressing a first control by the first user in a period of time;
receiving, from a second user, a second pressing operation performed on the photographing control; and
executing a second target event corresponding to a second pressing operation,
wherein the second target event is continuously shooting a plurality of photos depending on a second age of the second user and a second pressing duration of the second pressing operation,
wherein the second target event is continuously shooting the plurality of photos when a second threshold value is less than or equal to the second pressing duration,
wherein the second threshold value is based on the second age of the second user and a second touch pressure value,
wherein the second touch pressure value is a second average pressure value of pressing a second control by the second user in the period of time,
wherein the first age is greater than the second age of the second user, and
wherein the first pressing duration is the same as the second pressing duration of the second pressing operation.

9. The method of claim 8, wherein before the first pressing operation, the method further comprises obtaining a first face image of the first user wherein the first age is further based on the first face image, wherein before the second pressing operation, the method further comprises obtaining a second face image of the second user wherein the second age is further based on the second face image.

10. The method of claim 8, wherein the first age is further based on a first font size of the electronic device when the first user uses the electronic device, and wherein the second age is further based on a second font size of the electronic device when the second user uses the electronic device.

11. The method of claim 8, wherein the first pressing operation is a short press operation or a long press operation.

12. The method of claim 11, wherein the first pressing operation is the short press operation when the first pressing duration is less than the threshold value, and wherein the target event is shooting the photo when the first pressing operation is the short press operation.

13. The method of claim 8, wherein the second pressing operation is a short press operation or a long press operation.

14. An electronic device, comprising:
a memory configured to store a computer program code comprising computer instructions; and
a processor coupled to the memory, wherein when executed by the processor, the computer instructions cause the electronic device to:
receive, from a user, a pressing operation on a photographing control of a camera application installed on the electronic device;
execute a target event corresponding to the pressing operation,
wherein the target event is either shooting a photo or continuously shooting a plurality of photos depending on an age of the user and a pressing duration of the pressing operation,
wherein the target event is shooting the photo when the pressing duration is less than a threshold value, and wherein the threshold value is based on the age of the user and a touch pressure value,
wherein the second touch pressure value is a second average pressure value of pressing a second control by the second user in the period of time, and
wherein the target event is continuously shooting the plurality of photos when the pressing duration is greater than or equal to the threshold value.

15. The electronic device of claim 14, wherein when executed by the processor, the computer instructions further cause the electronic device to obtain a face image of the user, and wherein the age is further based on the face image.

16. The electronic device of claim 14, wherein the age is further based on a font size of the electronic device.

17. The electronic device of claim 14, wherein the pressing operation is a short press operation or a long press operation.

18. The electronic device of claim 14, wherein the pressing operation is the short press operation when the pressing duration is less than the threshold value, and wherein the target event is shooting the photo when the pressing operation is the short press operation.

19. The electronic device of claim 14, wherein the pressing operation is the long press operation when the pressing duration is greater than or equal to the threshold value, and wherein the target event is shooting the plurality of photos when the pressing operation is the long press operation.

20. The electronic device of claim 14, wherein the touch pressure value indicates the age of the user.

* * * * *